(12) United States Patent
Yamada et al.

(10) Patent No.: US 9,083,276 B2
(45) Date of Patent: Jul. 14, 2015

(54) ROTARY ELECTRIC MACHINE DRIVING SYSTEM

(75) Inventors: Eiji Yamada, Owariasahi (JP); Ryoji Mizutani, Nagoya (JP); Kenji Hiramoto, Owariasahi (JP); Hideo Nakai, Nisshin (JP); Norimoto Minoshima, Kariya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 108 days.

(21) Appl. No.: 13/982,499

(22) PCT Filed: Feb. 14, 2012

(86) PCT No.: PCT/IB2012/000260
§ 371 (c)(1),
(2), (4) Date: Jul. 30, 2013

(87) PCT Pub. No.: WO2012/110879
PCT Pub. Date: Aug. 23, 2012

(65) Prior Publication Data
US 2013/0314021 A1    Nov. 28, 2013

(30) Foreign Application Priority Data
Feb. 15, 2011   (JP) .................... 2011-029876

(51) Int. Cl.
*H02P 1/50* (2006.01)
*H02P 25/02* (2006.01)
*H02K 21/04* (2006.01)
*H02P 21/00* (2006.01)
*H02K 19/12* (2006.01)

(52) U.S. Cl.
CPC .............. *H02P 25/026* (2013.01); *H02K 19/12* (2013.01); *H02K 21/042* (2013.01); *H02P 21/0003* (2013.01)

(58) Field of Classification Search
CPC ........ H02P 25/021; H02P 25/026; H02P 1/50
USPC .......... 318/400.02, 400.22, 400.33, 716, 718, 318/727
See application file for complete search history.

(56) References Cited

U.S. PATENT DOCUMENTS

| 6,275,000 B1 | 8/2001 | Nishimura |
| 6,636,012 B2 * | 10/2003 | Royak et al. ................. 318/727 |
| 7,358,698 B2 | 4/2008 | Seguchi et al. |

(Continued)

FOREIGN PATENT DOCUMENTS

| CN | 101874337 A | 10/2010 |
| DE | 100 60 368 A1 | 12/2001 |

(Continued)

*Primary Examiner* — Paul Ip
(74) *Attorney, Agent, or Firm* — Oliff PLC

(57) ABSTRACT

A stator has multi-phase stator coils that are wound around a stator core by concentrated winding. A rotor has rotor coils that are wound at multiple portions of a rotor core in the circumferential direction and diodes that serve as rectifier unit that is connected to the rotor coils and that varies the magnetic characteristics of the respective rotor coils alternately in the circumferential direction. A rotary electric machine driving system includes a decreasing/increasing pulse superimposing unit that superimposes decreasing pulse current for a pulse-shaped decrease on a q-axis current command for passing currents through the stator coils and that superimposes increasing pulse current for a pulse-shaped increase on a d-axis current command.

9 Claims, 22 Drawing Sheets

(56) References Cited

U.S. PATENT DOCUMENTS

| | | | |
|---|---|---|---|
| 7,944,164 B2 * | 5/2011 | Liu et al. | 318/400.33 |
| 7,969,106 B2 * | 6/2011 | Kitanaka | 318/400.02 |
| 8,278,855 B2 * | 10/2012 | Kitanaka | 318/400.22 |
| 8,344,680 B2 * | 1/2013 | Kitanaka | 318/632 |
| 2003/0062870 A1 * | 4/2003 | Royak et al. | 318/727 |
| 2010/0026223 A1 * | 2/2010 | Liu et al. | 318/400.33 |
| 2010/0066283 A1 * | 3/2010 | Kitanaka | 318/400.02 |
| 2010/0259136 A1 | 10/2010 | Hiramoto et al. | |
| 2010/0259207 A1 * | 10/2010 | Kitanaka | 318/400.17 |
| 2011/0062908 A1 * | 3/2011 | Kitanaka | 318/400.22 |

FOREIGN PATENT DOCUMENTS

| | | |
|---|---|---|
| DE | 10 2006 029 459 A1 | 1/2007 |
| JP | A-2001-339998 | 12/2001 |
| JP | A 2007-185082 | 7/2007 |
| JP | A 2009-112091 | 5/2009 |
| JP | A 2010-98908 | 4/2010 |
| JP | A 2010-110079 | 5/2010 |
| JP | A-2010-136523 | 6/2010 |
| JP | A-2010-279165 | 12/2010 |
| JP | A 2011-41433 | 2/2011 |
| JP | A 2012-170252 | 9/2012 |
| WO | WO 2012/110883 A2 | 8/2012 |

* cited by examiner

ROTARY ELECTRIC MACHINE DRIVING SYSTEM

BACKGROUND OF THE INVENTION

1. Field of the Invention

The invention relates to a rotary electric machine driving system that includes a rotary electric machine having a stator and a rotor that are arranged to face each other, a driving unit that drives the rotary electric machine and a control unit that controls the driving unit.

2. Description of Related Art

As is described in Japanese Patent Application Publication No. 2009-112091 (JP-A-2009-112091), there is known a rotary electric machine in which rotor coils are provided for a rotor and induced currents are generated in the rotor coils by a revolving magnetic field to cause the rotor to generate torque. The revolving magnetic field is generated by a stator, and includes space harmonics. In addition, with this rotary electric machine, induced currents are efficiently generated in the rotor coils to make it possible to obtain the effect of efficiently increasing torque that acts on the rotor. FIG. 23 to FIG. 25 show the schematic configuration of the rotary electric machine described in JP-A-2009-112091. FIG. 23 is a view that shows the schematic configuration of a stator and rotor when viewed in the direction parallel to the rotation axis of the rotor. FIG. 24 shows the schematic configuration of the stator. FIG. 25 shows the schematic configuration of the rotor.

However, in the case of the rotary electric machine 10 shown in FIG. 23 to FIG. 25, there is still room for improvement in terms of effectively increasing torque during low-speed rotation where the rotation speed of the rotary electric machine 10 is low. FIG. 26 is a graph that shows an example of the correlation between a rotor rotation speed and a motor torque in a range in which the rotation speed is low when the same configuration as that of the rotary electric machine shown in FIG. 23 to FIG. 25 is used as an electric motor (motor). As shown in FIG. 26, the motor torque of the rotary electric machine 10 significantly decreases in the range in which the rotation speed is low. This is because, when description will be made with reference to FIG. 23 to FIG. 25, in the rotary electric machine 10, rotor induced currents that flow through rotor coils 18$n$ and 18$s$ are generated by magnetic field fluctuations due to the harmonic components of the revolving magnetic field generated by a stator 12, while magnetic fluxes that link with the rotor coils 18$n$ and 18$s$ do not change significantly in the range in which the rotation speed is low but the fluctuation velocity of linked magnetic fluxes decreases, so induced electromotive voltages decrease to reduce the rotor induced currents. Therefore, the motor torque reduces during low-speed rotation. Note that, in the above description, the motor torque decreases when the rotary electric machine 10 is used as an electric motor in the range in which the rotation speed is low; however, when the rotary electric machine 10 is used as a generator as well, regenerative torque may significantly decrease in the low-rotation speed range because of the same reason.

SUMMARY OF THE INVENTION

The inventors have an idea that there is a possibility that pulse current is superimposed on alternating currents to be passed through stator coils to thereby make induced currents generated in rotor coils to thereby make it possible to increase the torque of a rotary electric machine even in a low rotation speed range. However, the inventors found that, unless a method of superimposing pulse current is devised, the peak values of currents that flow through the stator coils become excessive and this may lead to inconvenience, such as an increase in size and cost of a control system that includes an inverter that is a rotary electric machine driving unit.

In contrast to this, Japanese Patent Application Publication No. 2007-185082 (JP-A-2007-185082), Japanese Patent Application Publication No. 2010-98908 (JP-A-2010-98908) and Japanese Patent Application Publication No. 2010-110079 (JP-A-2010-110079) describe a field winding synchronous machine that utilizes superimposition of pulse current; however, these publications do not describe measures for increasing torque while preventing excessive currents from flowing through the stator coils.

The invention implements a rotary electric machine that is able to increase torque even in a low rotation speed range while preventing excessive currents from flowing through stator coils in a rotary electric machine driving system.

A first aspect of the invention relates to a rotary electric machine driving system that includes: a rotary electric machine having a stator and a rotor that are arranged so as to face each other; a driving unit that drives the rotary electric machine; and a control unit that controls the driving unit. The stator has a stator core having a plurality of stator slots at intervals in a circumferential direction around a rotation axis of the rotor and multi-phase stator coils that are wound around the stator core via the stator slots by concentrated winding, the rotor has a rotor core having a plurality of rotor slots at intervals in the circumferential direction around the rotation axis of the rotor, rotor coils that are wound at multiple portions of the rotor core in the circumferential direction so as to be at least partially arranged in the rotor slots and a rectifier unit that is connected to the rotor coils and that varies magnetic characteristics of the respective rotor coils alternately in the circumferential direction among the plurality of rotor coils, and the rotor varies magnetic characteristics of magnetic pole portions at multiple portions in the circumferential direction alternately in the circumferential direction, the magnetic characteristics being generated by currents flowing through the respective rotor coils, and the control unit has a decreasing/increasing pulse superimposing unit that superimposes decreasing pulse current for a pulse-shaped decrease on a q-axis current command for passing currents through the stator coils so as to generate field magnetic fluxes in directions advanced by 90 degrees in electric angle with respect to magnetic pole directions that are winding central axis directions of the respective rotor coils and that superimposes increasing pulse current for a pulse-shaped increase on a d-axis current command for passing currents through the stator coils so as to generate field magnetic fluxes in the magnetic pole directions. Note that the decreasing pulse current means pulse current that steeply decreases and then steeply increases in a pulse-shaped manner and the increasing pulse current means pulse current that steeply increases and then steeply decreases in a pulse-shaped manner. In addition, the pulse-shaped waveform of each of the decreasing pulse current and the increasing pulse current may be any of a rectangular wave, a triangular wave and a waveform formed from a plurality of curves and/or lines into a projecting shape. Note that the "rotor core" means an integral member other than the rotor coils in the rotor, and may be, for example, formed of magnets and a rotor core body made of a magnetic material. In addition, the "rotor slots" are not limited to portions that have a groove shape and that open to the peripheral surface of the rotor core, and, for example, include slits that do not open to the peripheral surface of the rotor core and that are formed to extend through in the axial direction inside the rotor core.

With the rotary electric machine driving system, it is possible to implement a rotary electric machine that is able to increase torque even in a low rotation speed range while preventing excessive currents from flowing through stator coils. That is, by superimposing decreasing pulse current on the q-axis current command and superimposing increasing pulse current on the d-axis current command, it is possible to increase induced currents that occur in the rotor coils while currents of all the phases are caused to fall within the required current limit range. In addition, increasing pulse current is superimposed on the d-axis current command, so it is possible to increase the amount of fluctuations in magnetic fluxes that pass through the d-axis magnetic paths generated by the d-axis current command. The d-axis magnetic paths are able to reduce the passage of magnetic fluxes through an air gap as compared with the q-axis magnetic paths corresponding to the q-axis current command, so magnetic resistance decreases. Therefore, increasing the amount of fluctuations in d-axis magnetic fluxes is effective at increasing torque. Thus, it is possible to increase induced currents induced in the rotor coils even in a low rotation speed range while suppressing the peaks of stator currents of all the phases, so it is possible to increase the torque of the rotary electric machine.

The decreasing/increasing pulse superimposing unit may superimpose the increasing pulse current on the d-axis current command and may not superimpose the decreasing pulse current on the q-axis current command when an output torque of the rotary electric machine is lower than or equal to a threshold, and may superimpose the increasing pulse current on the d-axis current command and may superimpose the decreasing pulse current on the q-axis current command when the output torque exceeds the threshold.

The decreasing/increasing pulse superimposing unit may superimpose the decreasing pulse current on the q-axis current command and may superimpose the increasing pulse current on the d-axis current command such that a current vector after pulse current is superimposed on stator currents to be passed through the stator coils falls within a control circle drawn by a distal end of a current vector that is defined in dq coordinate system when the pulse current is not superimposed on the stator currents.

Each of the rotor coils may be connected to any one of rectifier elements that serve as the rectifier unit and of which forward directions are opposite between any adjacent two of the rotor coils in the circumferential direction of the rotor, and the rectifier elements may rectify currents that are generated by induced electromotive forces to flow through the rotor coils to thereby vary phases of currents flowing through any adjacent two of the rotor coils in the circumferential direction alternately between an A phase and a B phase.

The rectifier elements may be a first rectifier element and a second rectifier element that are respectively connected to the corresponding rotor coils, and the first rectifier element and the second rectifier element may independently rectify currents generated due to the generated induced electromotive forces so that the rectified currents flow through the corresponding rotor coils, and may vary the magnetic characteristics of the magnetic pole portions at multiple portions in the circumferential direction alternately in the circumferential direction, the magnetic characteristics being generated by currents flowing through the respective rotor coils.

The rotor core may include salient poles that are the plurality of magnetic pole portions that are arranged at intervals in the circumferential direction of the rotor and that protrude toward the stator, and the salient poles may be magnetized as currents rectified by the rectifier unit flow through the rotor coils to thereby function as magnets having fixed magnetic poles.

The rotor core may include salient poles that are the plurality of magnetic pole portions that are arranged at intervals in the circumferential direction of the rotor and that protrude toward the stator, and the salient poles may be magnetized as currents rectified by the rectifier elements flow through the rotor coils to thereby function as magnets having fixed magnetic poles, and the rotor may further have auxiliary rotor coils that are wound at proximal portions of the respective salient poles, any two of the auxiliary rotor coils wound around any adjacent two of the salient poles in the circumferential direction of the rotor may be connected in series with each other to constitute an auxiliary coil set, and one ends of any adjacent two of the rotor coils, wound around any adjacent two of the salient poles in the circumferential direction of the rotor, may be connected to each other at a connection point via the respectively corresponding rectifier elements such that the respectively corresponding rectifier elements face each other in opposite directions, the other ends of the any adjacent two of the rotor coils, wound around any adjacent two of the salient poles in the circumferential direction of the rotor, each may be connected to one end of the auxiliary coil set, and the connection point may be connected to the other end of the auxiliary coil set.

A width of each salient pole in the circumferential direction of the rotor may be smaller than a width corresponding to 180° in electric angle, and each of the rotor coils may be wound around a corresponding one of the salient poles by short pitch winding.

A width of each rotor coil in the circumferential direction of the rotor may be equal to a width corresponding to 90° in electric angle.

With the rotary electric machine driving system according to the aspect of the invention, it is possible to implement the rotary electric machine that is able to increase torque even in a low rotation speed range while preventing excessive currents from flowing through the stator coils.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
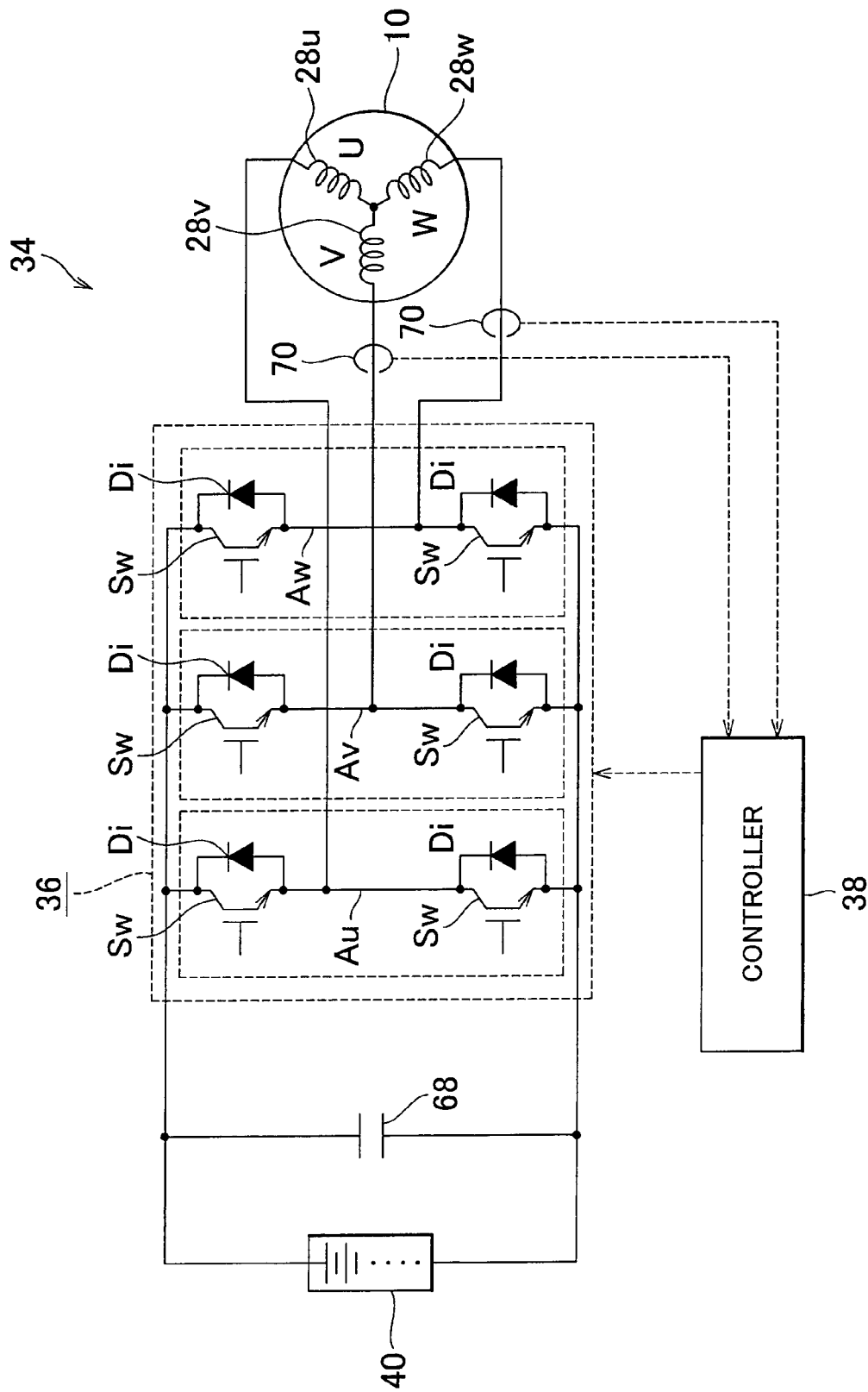
FIG. 1 is a view that shows the schematic configuration of a rotary electric machine driving system according to an embodiment of the invention.
Figure 2:
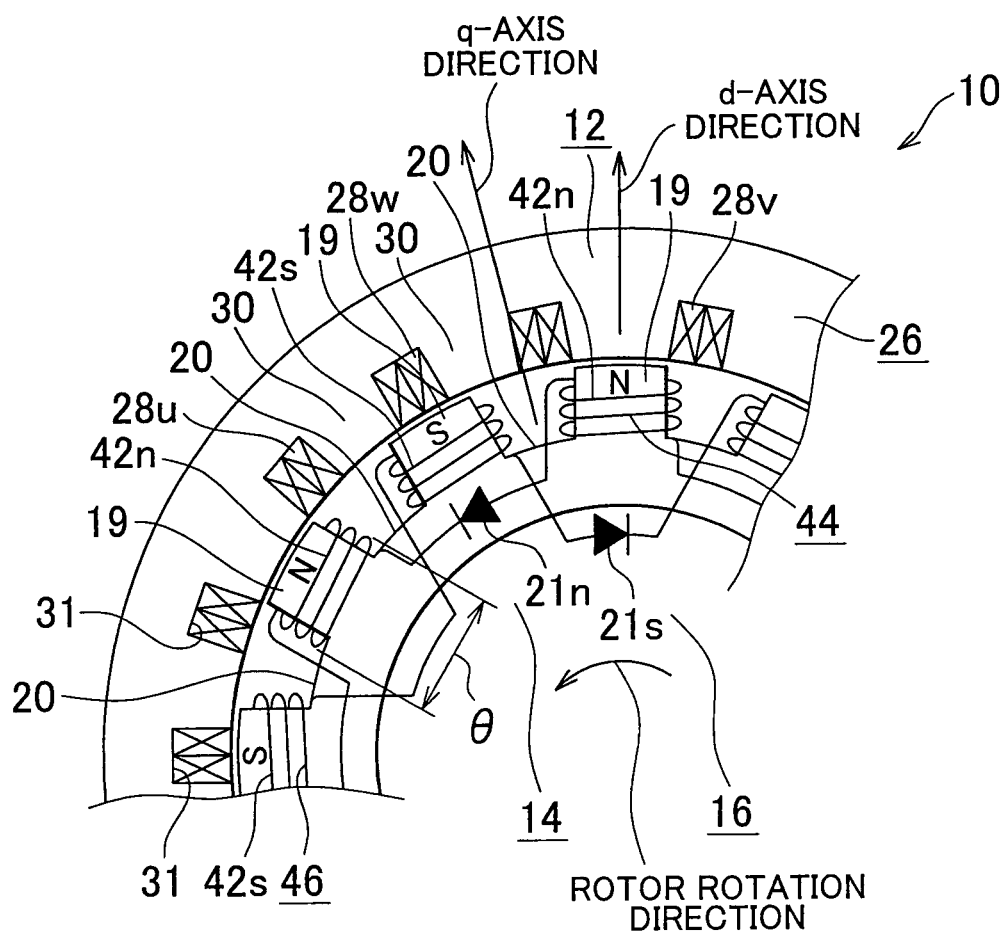
FIG. 2 is a schematic view that partially shows a portion at which a stator faces a rotor in the embodiment of the invention.
Figure 3A:
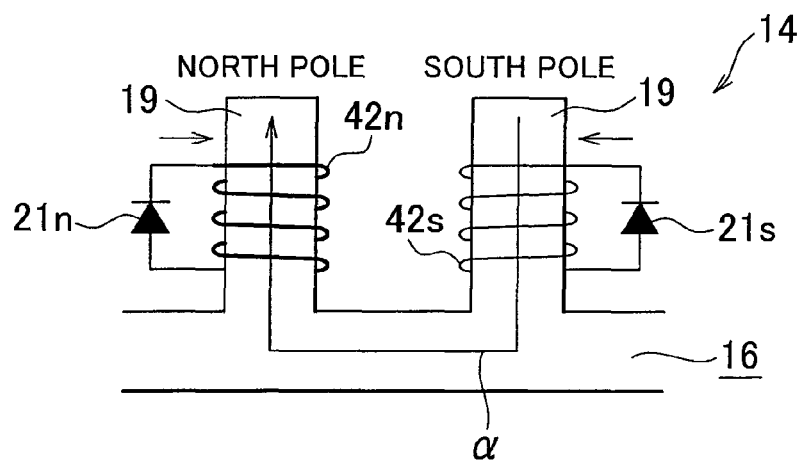
FIG. 3A is a schematic view that shows a state where a magnetic flux passes in the rotor in the embodiment of the invention.
Figure 3B:
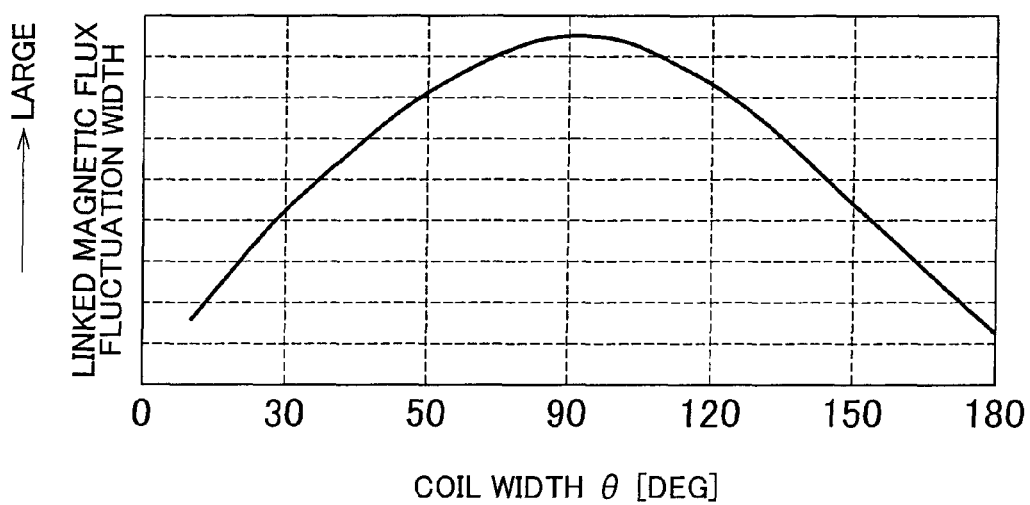
FIG. 3B is a graph that shows the result obtained by calculating the amplitude of a magnetic flux that links with a rotor coil while varying the width θ of the rotor coil in the circumferential direction in the rotary electric machine shown in FIG. 2.
Figure 4:
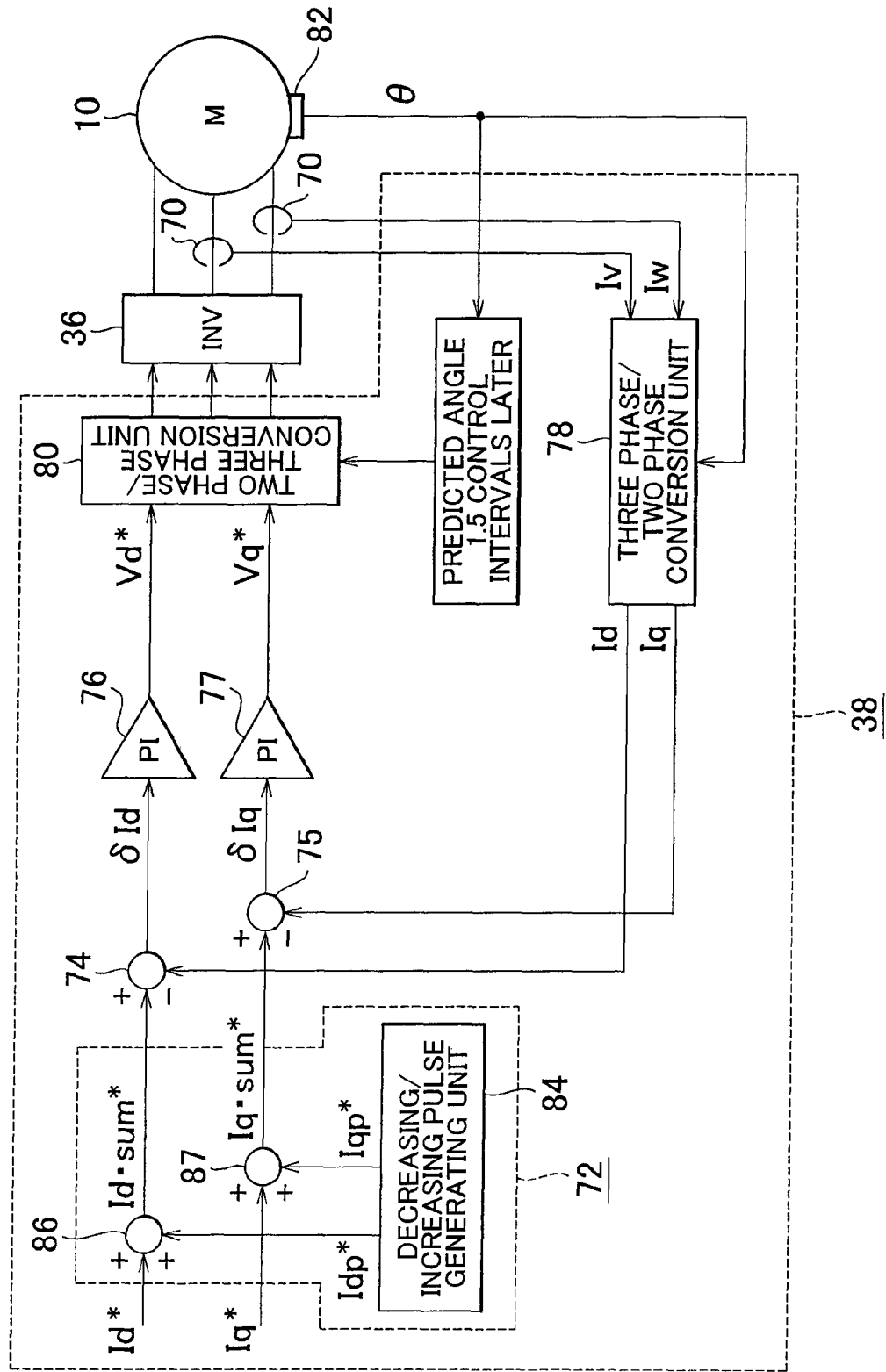
FIG. 4 is a block diagram that shows the configuration of a controller in the embodiment of the invention.

FIG. 1 to FIG. 8 and FIG. 10 are views that show an embodiment of the invention. FIG. 1 is a view that shows the schematic configuration of a rotary electric machine driving system according to the embodiment. FIG. 2 is a schematic view that partially shows a portion at which a stator faces a rotor in the embodiment. FIG. 3A is a schematic view that shows a state where a magnetic flux passes through the rotor in the embodiment. FIG. 3B is a graph that shows the result obtained by calculating the amplitude of a magnetic flux that links with a rotor coil while varying the width θ of the rotor coil in the circumferential direction in the rotary electric machine shown in FIG. 2. FIG. 4 is a block diagram that shows the configuration of a controller in the embodiment. As shown in FIG. 1, a rotary electric machine driving system 34 according to the embodiment includes a rotary electric machine 10, an inverter 36, a controller 38 and an electrical storage device 40. The inverter 36 is a driving unit that drives the rotary electric machine 10. The controller 38 is a control unit that controls the inverter 36. The electrical storage device 40 is a power source. The rotary electric machine driving system 34 drives the rotary electric machine 10. In addition, as shown in FIG. 2, the rotary electric machine 10, which serves as an electric motor or a generator, includes a stator 12 and a rotor 14. The stator 12 is fixed to a casing (not shown). The rotor 14 is arranged on the inner side of the stator 12 in the radial direction with a predetermined gap so as to face the stator 12, and is rotatable with respect to the stator 12. Note that the "radial direction" means a radiation direction perpendicular to the rotation axis of the rotor (hereinafter, unless otherwise specified, the meaning of the "radial direction" is the same).

Figure 23:
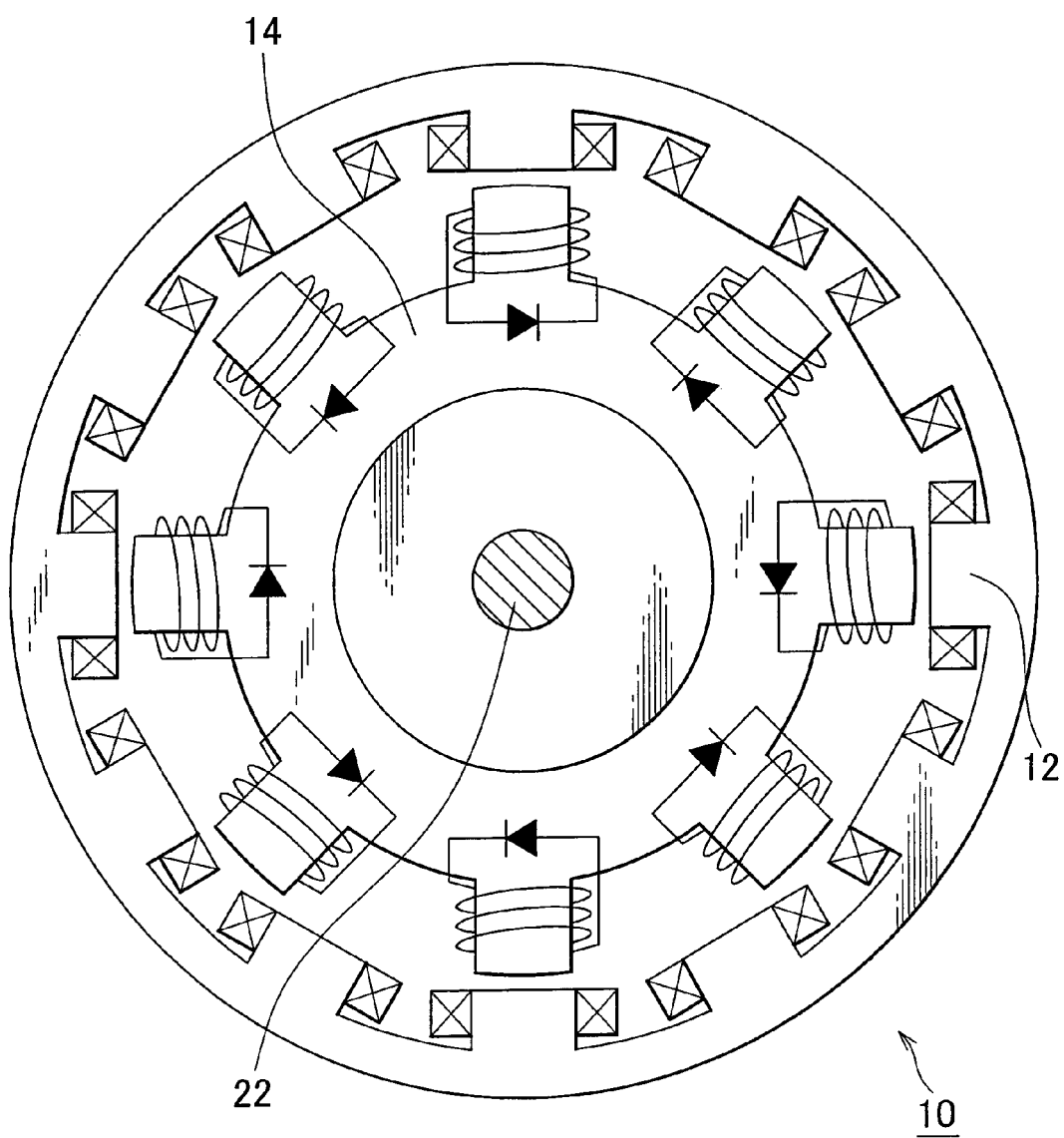
FIG. 23 is a view that shows the schematic configuration of a stator and rotor when viewed in the direction parallel to the rotation axis of the rotor in an existing rotary electric machine.

In addition, the stator 12 includes a stator core 26 and multi-phase (more specifically, for example, three U-phase, V-phase and W-phase) stator coils 28u, 28v and 28w. The stator core 26 is made of a magnetic material. The stator coils 28u, 28v and 28w are arranged on the stator core 26. Teeth 30 are arranged at multiple portions of the stator core 26 in the circumferential direction. The teeth 30 are a plurality of stator teeth that protrude toward the inner side in the radial direction (toward the rotor 14 (FIG. 23)). A slot 31, which is a stator slot, is formed between any adjacent teeth 30. Note that the "circumferential direction" means a direction along the circle drawn about the rotation central axis of the rotor (hereinafter, unless otherwise specified, the meaning of the "circumferential direction" is the same).

That is, the plurality of teeth 30 that protrude toward the inner side in the radial direction (toward the rotor 14) are arranged on the inner peripheral surface of the stator core 26 at intervals along the circumferential direction around the rotation central axis that is the rotation axis of the rotor 14, and the slots 31, each of which is formed between any adjacent teeth 30, are formed at intervals in the circumferential direction. That is, the stator core 26 has a plurality of slots 31 that are formed at intervals in the circumferential direction around the rotation axis of the rotor 14.

The three-phase stator coils 28*u*, 28*v* and 28*w* are wound around the corresponding teeth 30 of the stator core 26 via the slots 31 by concentrated short pitch winding. In this way, the stator coils 28*u*, 28*v* and 28*w* are wound around the corresponding teeth 30 to constitute magnetic poles. Then, multiphase alternating currents are passed through the multi-phase stator coils 28*u*, 28*v* and 28*w* to magnetize the teeth 30 aligned in the circumferential direction. By so doing, revolving magnetic fields that revolve in the circumferential direction may be generated in the stator 12. Note that the stator coils are not limited to the configuration that the stator coils are wound around the corresponding teeth of the stator in this way; the stator coils may be wound around the stator core other than the teeth of the stator.

The revolving magnetic fields formed in the teeth 30 are applied to the rotor 14 from the distal end surfaces of the teeth 30. In the example shown in FIG. 2, one pole pair is formed of the three teeth 30 around which the three-phase (U-phase, V-phase and W-phase) stator coils 28*u*, 28*v* and 28*w* are respectively wound.

In addition, the rotor 14 includes a rotor core 16 made of a magnetic material and a plurality of rotor coils 42*n* and 42*s*. Teeth 19 are provided at multiple portions of the outer peripheral surface of the rotor core 16 in the circumferential direction so as to protrude toward the outer side in the radial direction (toward the stator 12), and are arranged at intervals along the outer peripheral surface of the rotor core 16. The teeth 19 are a plurality of magnetic pole portions (protrusions and salient poles) and are rotor teeth. The teeth 19 face the stator 12. In addition, slots 20, each of which is a rotor slot between any adjacent teeth 19 of the rotor core 16, are formed at intervals in the circumferential direction. That is, the rotor core 16 has the plurality of slots 20 that are formed at intervals in the circumferential direction around the rotation axis of the rotor 14.

Because of the teeth 19, magnetic resistances in the case where magnetic fluxes pass from the stator 12 (teeth 30) vary with the rotation direction of the rotor 14. Magnetic resistance is low at the position of each of the teeth 19, and magnetic resistance is high at the position between any adjacent teeth 19. Then, the rotor coils 42*n* and 42*s* are wound around these teeth 19 such that the rotor coils 42*n* and the rotor coils 42*s* are alternately aligned in the circumferential direction. Here, the winding central axis of each of the rotor coils 42*n* and 42*s* coincides with the radial direction.

In addition, the plurality of first rotor coils 42*n* are respectively wound around the every other teeth 19 in the circumferential direction of the rotor 14 by concentrated winding, and the plurality of second rotor coils 42*s* are respectively wound around the other teeth 19 by concentrated winding. The other teeth 19 are adjacent to the teeth 19 around which the first rotor coils 42*n* are wound, and are the every other teeth 19 in the circumferential direction. In addition, diodes 21*n* and 21*s* are respectively connected to a first rotor coil circuit 44 and a second rotor coil circuit 46. The first rotor coil circuit 44 includes the plurality of first rotor coils 42*n*. The second rotor coil circuit 46 includes the plurality of second rotor coils 42*s*. That is, the plurality of first rotor coils 42*n* arranged alternately in the circumferential direction of the rotor 14 are electrically connected in series with one another and are connected endlessly, and the diode 21*n* is connected in series with each of the first rotor coils 42*n* at a portion between any two of the plurality of first rotor coils 42*n* to thereby constitute the first rotor coil circuit 44. The diode 21*n* is a rectifier unit (rectifier element), and is a first diode. The first rotor coils 42*n* are wound around the teeth 19 that function as the same magnetic poles (north poles).

In addition, the plurality of second rotor coils 42*s* are electrically connected in series with one another and are endlessly connected, and the diode 21*s* is connected in series with each of the second rotor coils 42*s* at a portion between any two of the plurality of second rotor coils 42*s* to thereby constitute the second rotor coil circuit 46. The diode 21*s* is a rectifier unit (rectifier element), and is a second diode. The second rotor coils 42*s* are wound around the teeth 19 that function as the same magnetic poles (south poles). In addition, the rotor coils 42*n* and 42*s* that are respectively wound around any adjacent teeth 19 (which form magnets having different magnetic poles) in the circumferential direction are electrically isolated from each other. In this way, the rotor coils 42*n* and 42*s* are wound at multiple portions of the outer peripheral portion of the rotor core 16 in the circumferential direction so as to be respectively partially arranged in the corresponding slots 20.

Figure 24:
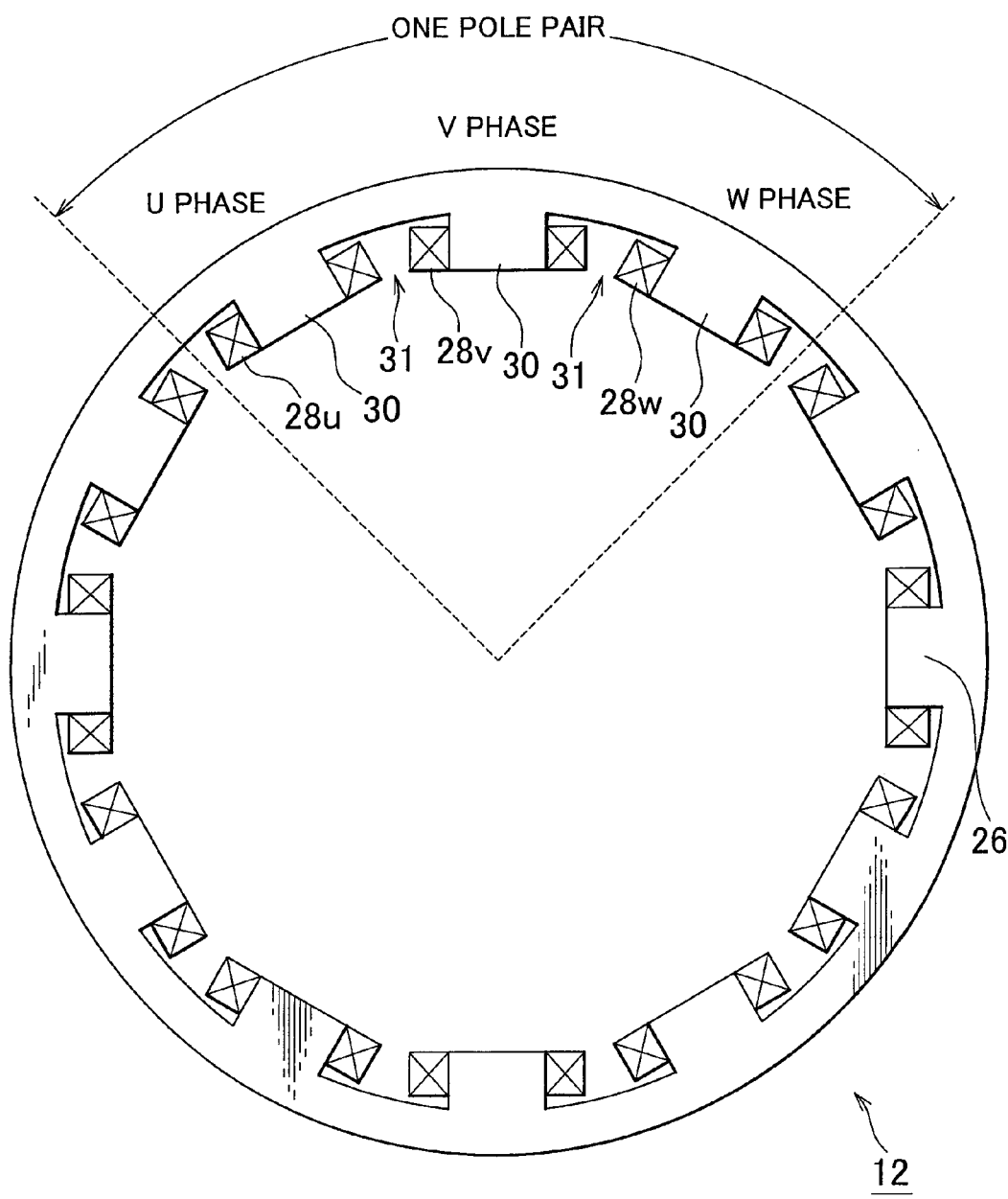
FIG. 24 is a view that shows the schematic configuration of the stator in the rotary electric machine of FIG. 23.
Figure 25:
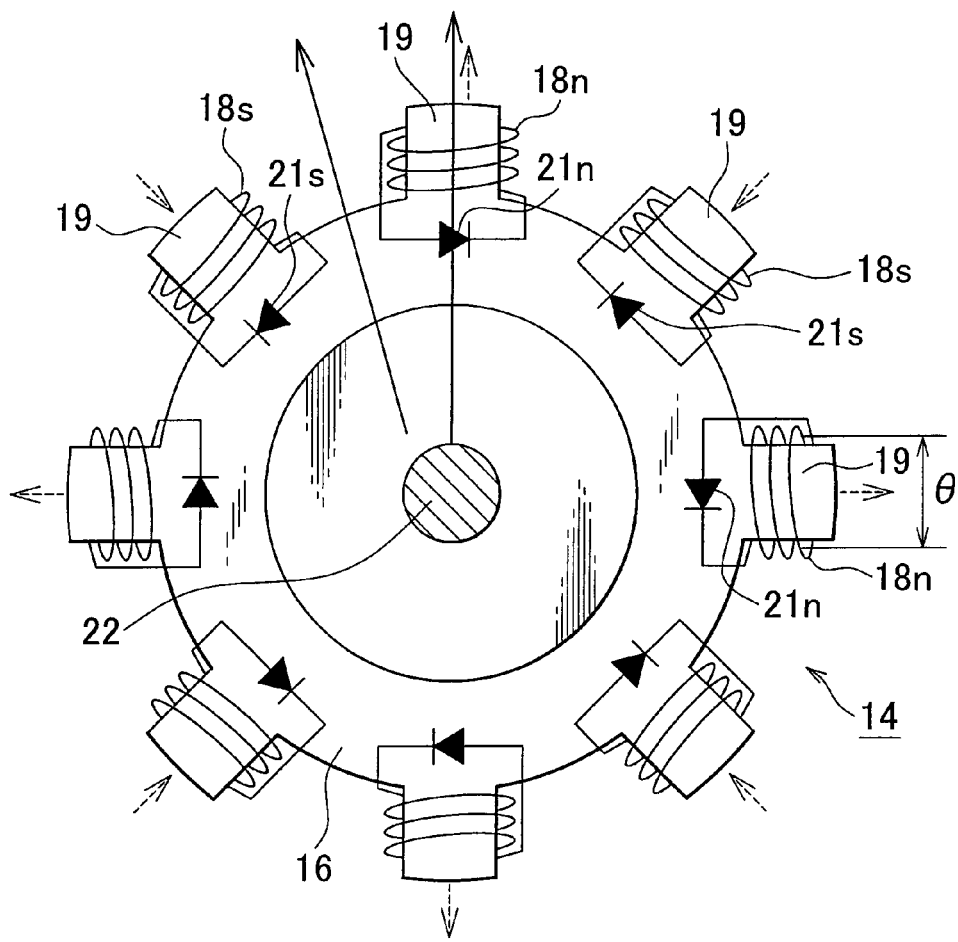
FIG. 25 is a view that shows the schematic configuration of the rotor in the rotary electric machine of FIG. 23.
Figure 26:
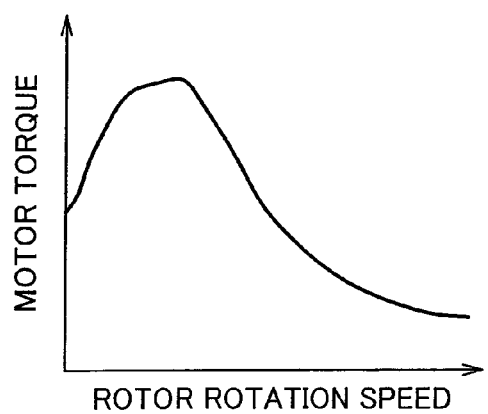
FIG. 26 is a graph that shows an example of the correlation between a rotor rotation speed and a motor torque in the same configuration as that of the rotary electric machine of FIG. 23.

In addition, the rectification directions in which currents flowing through the rotor coils 42*n* and 42*s* are respectively rectified by the diodes 21*n* and 21*s* are opposite so as to form magnets having different magnetic poles in the any adjacent teeth 19 of the rotor 14 in the circumferential direction. That is, the diodes 21*n* and 21*s* are respectively connected to the rotor coils 42*n* and 42*s* in mutually opposite directions such that the directions of currents respectively flowing through any adjacent two of the rotor coils 42*n* and 42*s* in the circumferential direction of the rotor 14 (the rectification directions of the respective diodes 21*n* and 21*s*), that is, the forward directions, are opposite to each other. Then, the diodes 21*n* and 21*s* respectively rectify currents that flow through the corresponding rotor coils 42*n* and 42*s* because of induced electromotive forces generated by revolving magnetic fields that are generated by the stator 12 and that include space harmonics. By so doing, the phases of currents flowing through any adjacent two of the rotor coils 42*n* and 42*s* in the circumferential direction of the rotor 14 are alternately varied between an A phase and a B phase. The A phase is to generate the north pole at the distal end side of a corresponding one of the teeth 19. The B phase is to generate the south pole at the distal end side of a corresponding one of the teeth 19. That is, the rectifier elements provided for the rotor 14 are the diode 21*n*, which is a first rectifier element, and the diode 21*s*, which is a second rectifier element. The diode 21*n* and the diode 21*s* are respectively connected to the corresponding rotor coils 42*n* and 42*s*. In addition, the diodes 21*n* and 21*s* respectively independently rectify currents flowing through the corresponding rotor coils 42*n* and 42*s* because of generated induced electromotive forces, and vary the magnetic characteristics of the teeth 19 at multiple portions in the circumferential direction alternately in the circumferential direction. The magnetic characteristics of the teeth 19 are generated by currents flowing through the respective rotor coils 42*n* and 42*s*. In this way, the plurality of diodes 21*n* and 21*s* vary the magnetic characteristics alternately in the circumferential direction. The magnetic characteristics are respectively generated in the plurality of teeth 19 by induced electromotive forces generated in the rotor coils 42*n* and 42*s*. That is, the diodes 21*n* and 21*s* are connected to the corresponding rotor coils 42*n* and 42*s*, and vary the magnetic characteristics of the respective rotor coils 42*n* and 42*s* alternately in the circumferential direction among the plurality of rotor coils 42*n* and 42*s*. With this configuration, different from the case of the configuration shown in FIG. 23 to FIG. 25, the number of the diodes 21*n* and 21*s* may be reduced to two, so the coil structure of the rotor 14 may be simplified. In addition, the rotor 14 is concentrically fixed to the outer side of a rotary shaft 22 (see FIG. 23, FIG. 25, and the like, and not shown in FIG. 2) in the radial direction. The rotary shaft 22 is rotatably supported by a casing (not shown). Note that, in the present embodiment, the rectifier elements are connected to the corresponding rotor coils 42n and 42s; however, in the aspect of the invention, the rectifier unit that alternately varies the magnetic characteristics of the rotor coils in the circumferential direction among the plurality of rotor coils just needs to be connected to the rotor coils, and the rectifier unit may use a configuration other than the rectifier elements. Note that the rotor coils 42n and 42s may be wound around the corresponding teeth 19 via insulators, or the like, made of resin, or the like, having electrical insulation properties.

In addition, the width θ of each of the rotor coils 42n and 42s in the circumferential direction of the rotor 14 is set so as to be shorter than the width corresponding to 180° in the electric angle of the rotor 14, and the rotor coils 42n and 42s are respectively wound around the teeth 19 by short pitch winding. More desirably, the width θ of each of the rotor coils 42n and 42s in the circumferential direction of the rotor 14 is equal to or substantially equal to the width corresponding to 90° in the electric angle of the rotor 14. The width θ of each of the rotor coils 42n and 42s here may be expressed by the center width of the cross section of each of the rotor coils 42n and 42s in consideration of the cross-sectional area of each of the rotor coils 42n and 42s. That is, the width θ of each of the rotor coils 42n and 42s may be expressed by the mean value of the width of the inner peripheral surface and the width of the outer peripheral surface of each of the rotor coils 42n and 42s. Note that the electric angle of the rotor 14 is expressed by a value that is obtained by multiplying the mechanical angle of the rotor 14 by the number p of pole pairs of the rotor 14 (electric angle=mechanical angle×p). Therefore, the width θ of each of the rotor coils 42n and 42s in the circumferential direction satisfies the following mathematical expression (1) where the distance from the rotation central axis of the rotor 14 to each of the rotor coils 42n and 42s is r.

$$\theta < \pi \times r / p \quad (1)$$

The reason why the width θ is restricted by the mathematical expression (1) will be described in detail later.

In addition, as shown in FIG. 1, the electrical storage device 40 is provided as a direct-current power supply. The electrical storage device 40 is chargeable and dischargeable, and is, for example, formed of a secondary battery. The inverter 36 includes three U-phase, V-phase and W-phase arms Au, Av and Aw. In each of the three-phase arms Au, Av and Aw, two switching elements Sw are connected in series with each other. The switching elements Sw are transistors, IGBTs, or the like. In addition, a diode D1 is connected in antiparallel with each of the switching elements Sw. Furthermore, the midpoints of the arms Au, Av and Aw are respectively connected to one ends of the corresponding phase stator coils 28u, 28v and 28w that constitute the rotary electric machine 10. Among the stator coils 28u, 28v and 28w, the stator coils of the same phase are connected in series with one another, and the stator coils 28u, 28v and 28w of the different phases are connected to one another at a neutral point.

In addition, the positive electrode side and negative electrode side of the electrical storage device 40 are respectively connected to the positive electrode side and negative electrode side of the inverter 36, and a capacitor 68 is connected in parallel with the inverter 36 between the electrical storage device 40 and the inverter 36. The controller 38, for example, calculates the torque target of the rotary electric machine 10 in response to an acceleration command signal input from an accelerator pedal sensor (not shown), or the like, of a vehicle, and then controls switching operations of the switching elements Sw on the basis of a current command value according the torque target, and the like. Signals that indicate current values detected by current sensors 70 provided for at least two-phase stator coils (for example, 28u and 28v) among the three-phase stator coils and a signal that indicates the rotation angle of the rotor 14 of the rotary electric machine 10, detected by a rotation angle detecting unit 82 (FIG. 4), such as a resolver, are input to the controller 38. The controller 38 includes a microcomputer that has a CPU, a memory, and the like. The controller 38 controls switching of the switching elements Sw of the inverter 36 to control the torque of the rotary electric machine 10. The controller 38 may be formed of a plurality of controllers divided function by function.

The thus configured controller 38 is able to convert direct-current power from the electrical storage device 40 to three U-phase, V-phase and W-phase alternating-current power by the switching operations of the switching elements Sw that constitute the inverter 36 to supply the three-phase stator coils 28u, 28v and 28w with powers of the corresponding phases. With the thus configured controller 38, it is possible to control the torque of the rotor 14 (FIG. 2) by controlling the phases (advances) of alternating currents flowing through the stator coils 28u, 28v and 28w.

In addition, with the rotary electric machine 10 shown in FIG. 2, induced currents are generated in the rotor coils 42n and 42s by the revolving magnetic fields to thereby make it possible to cause the rotor 14 to generate torque. The revolving magnetic fields are generated by the stator 12, and include space harmonics. That is, the distribution of magnetomotive forces that cause the stator 12 to generate revolving magnetic fields is not a sinusoidal distribution (of only the fundamental) but includes harmonic components because of arrangement of the three-phase stator coils 28u, 28v and 28w and the shape of the stator core 26 due to the teeth 30 and the slots 31. Particularly, in concentrated winding, the three-phase stator coils 28u, 28v and 28w do not overlap one another, so the amplitude level of harmonic components that occur in the magnetomotive force distribution of the stator 12 increases. For example, when the stator coils 28u, 28v and 28w are formed by three-phase concentrated winding, the amplitude level of spatial secondary component that is the (temporal) tertiary component of input electrical frequency increases as harmonic components. The harmonic components that occur in magnetomotive forces because of arrangement of the stator coils 28u, 28v and 28w and the shape of the stator core 26 in this way are called space harmonics.

In addition, as three-phase alternating currents are passed through the three-phase stator coils 28u, 28v and 28w to cause the revolving magnetic fields (fundamental components) formed in the teeth 30 to be applied to the rotor 14, the teeth 19 are attracted by the revolving magnetic fields of the teeth 30 such that the magnetic resistance of the rotor 14 reduces. By so doing, torque (reluctance torque) acts on the rotor 14.

Furthermore, as the revolving magnetic fields that are formed in the teeth 30 and that include space harmonic components link with the rotor coils 42n and 42s of the rotor 14, magnetic flux fluctuations in frequency different from the rotation frequency (the fundamental components of the revolving magnetic fields) of the rotor 14 occur in the rotor coils 42n and 42s because of the space harmonic components. Because of the magnetic flux fluctuations, induced electromotive forces are generated in the rotor coils 42n and 42s. With the generated induced electromotive forces, currents flowing through the rotor coils 42n and 42s are respectively rectified by the diodes 21n and 21s so as to have a one-way direction (direct current). Then, the teeth 19 that are rotor teeth are magnetized as direct currents rectified by the diodes 21n and 21s flow through the rotor coils 42n and 42s. By so doing, each of the teeth 19 functions as a magnets having a fixed magnetic pole (any one of the north pole and the south pole). As described above, the rectification directions in which currents flowing through the rotor coils 42n and 42s are rectified by the diodes 21n and 21s are opposite to each other, so magnets generated in the respective teeth 19 are such that the north poles and the south poles are alternately arranged in the circumferential direction. Then, the magnetic fields of the teeth 19 (magnets having fixed magnetic poles) interact with the revolving magnetic fields (fundamental components) generated by the stator 12 to generate attraction and repulsion actions. Torque (which corresponds to magnet torque) may be applied to the rotor 14 even by the electromagnetic interaction (attraction and repulsion actions) between the revolving magnetic fields (fundamental components) generated by the stator 12 and the magnetic fields of the teeth 19 (magnets), and the rotor 14 is driven for rotation in synchronization with the revolving magnetic fields (fundamental components) generated by the stator 12. In this way, the rotary electric machine 10 is able to function as an electric motor that utilizes electric power supplied to the stator coils 28u, 28v and 28w to cause the rotor 14 to generate power (mechanical power).

In this case, in the rotor 14, as shown by the schematic view in FIG. 3A, the different diodes 21n and 21s are respectively connected to the rotor coils 42n and 42s that are respectively wound around any adjacent teeth 19 in the circumferential direction of the rotor 14. The revolving magnetic fields that are generated by the stator 12 (FIG. 2) and that include harmonics link with the rotor coils 42n and 42s. By so doing, induced currents of which the directions are regulated by the diodes 21n and 21s are induced in the rotor coils 42n and 42s, and the teeth 19 are magnetized as different magnetic pole portions between any adjacent teeth 19. In this case, a magnetic flux caused by induced current passes through the teeth 19 and a portion of the rotor core 16 other than the teeth 19 in the direction indicated by the arrow α in FIG. 3A.

In addition, the rotary electric machine driving system 34 shown in FIG. 1 is, for example, mounted on a hybrid vehicle, a fuel-cell vehicle, an electric vehicle, or the like, as a vehicle driving power generating device and is used. The hybrid vehicle includes an engine and a drive motor as driving sources. Note that it is also applicable that a DC/DC converter that is a voltage conversion unit is connected between the electrical storage device 40 and the inverter 36 and the voltage of the electrical storage device 40 is stepped up and supplied to the inverter 36.

In addition, the controller 38 of the rotary electric machine driving system 34 has a decreasing/increasing pulse superimposing unit 72 (FIG. 4). The decreasing/increasing pulse superimposing unit 72 superimposes decreasing pulse current for a pulse-shaped decrease on a q-axis current command for passing currents through the stator coils 28u, 28v and 28w so as to generate field magnetic fluxes in q-axis directions (described later), and superimposes increasing pulse current for a pulse-shaped increase on a d-axis current command for passing currents through the stator coils 28u, 28v and 28w so as to generate field magnetic fluxes in d-axis directions (described later). This will be described in detail with reference to FIG. 4. FIG. 4 is a view that shows the configuration of an inverter control unit in the controller 38. The controller 38 includes a current command calculation unit (not shown), the decreasing/increasing pulse superimposing unit 72, subtracting units 74 and 75, PI operation units 76 and 77, a three phase/two phase conversion unit 78, a two phase/three phase conversion unit 80, the rotation angle detecting unit 82, a PWM signal generating unit (not shown) and a gate circuit (not shown).

The current command calculation unit calculates current command values Id* and Iq* corresponding to the d axis and the q axis in accordance with a prepared table, and the like, on the basis of the torque command value of the rotary electric machine 10, calculated in response to an acceleration command input from a user. Here, the d axis means a magnetic pole direction that is the winding central axis direction of each of the rotor coils 42n and 42s in the circumferential direction of the rotary electric machine 10, and the q axis means a direction advanced by 90 degrees in electric angle with respect to the d axis. For example, when the rotation direction of the rotor 14 is defined as shown in FIG. 2, the d-axis direction and the q-axis direction are defined by the relationship as indicated by the arrows in FIG. 2. In addition, the current command values Id* and Iq* are respectively a d-axis current command value that is a command value for a d-axis current component and a q-axis current command value that is a command value for a q-axis current component. Such the d axis and the q axis are used to make it possible to determine currents to be passed through the stator coils 28u, 28v and 28w by vector control.

The three phase/two phase conversion unit 78 calculates a d-axis current value Id and a q-axis current value Iq, which are two-phase currents, from the rotation angle θ of the rotary electric machine 10, detected by the rotation angle detecting unit 82 provided for the rotary electric machine 10, and the two-phase currents (for example, V-phase and W-phase currents Iv and Iw) detected by the current sensors 70. Note that the reason why only two-phase currents are detected by the current sensors 70 is because the sum of the two-phase currents (the d-axis current value Id and the q-axis current value Iq) is 0 and, therefore, the other phase current may be calculated. However, it is also applicable that the U-phase, V-phase and W-phase currents are detected and then the d-axis current value Id and the q-axis current value Iq are calculated from those current values.

The decreasing/increasing pulse superimposing unit 72 has a decreasing/increasing pulse generating unit 84 and adding units 86 and 87. The decreasing/increasing pulse generating unit 84 generates decreasing pulse current to be superimposed on q-axis current and increasing pulse current to be superimposed on d-axis current. The adding units 86 and 87 are used to respectively add increasing pulse current and decreasing pulse current to d-axis current and q-axis current. The adding unit 86 for d-axis current superimposes or adds increasing pulse current Idp* to a d-axis current command value Id* at set intervals, and then outputs a superimposed d-axis current command value Idsum* after the addition to the corresponding subtracting unit 74. The adding unit 87 for q-axis current superimposes or adds decreasing pulse current Iqp* to a q-axis current command value Iq* at the same timing at which increasing pulse current is superimposed on d-axis current, and then outputs a superimposed q-axis current command value Iqsum* after the addition to the corresponding subtracting unit 75. In addition, the subtracting unit 74 corresponding to the d axis obtains a deviation δId between the superimposed d-axis current command value Idsum* and the d-axis current Id converted by the three phase/two phase conversion unit 78 and then inputs the deviation δId to the PI operation unit 76 corresponding to the d axis.

In addition, the subtracting unit 75 corresponding to the q axis obtains a deviation δIq between the superimposed q-axis current command value Iqsum* and the q-axis current Iq converted by the three phase/two phase conversion unit 78 and then inputs the deviation δIq to the PI operation unit 77 corresponding to the q axis. The PI operation units 76 and 77 respectively perform PI operation over the input deviations δId and δIq by a predetermined gain to obtain control deviations and then calculate a d-axis voltage command value Vd* and a q-axis voltage command value Vq* corresponding to the control deviations.

The two phase/three phase conversion unit 80 converts the voltage command values Vd* and Vq* input from the PI operation units 76 and 77 to three U-phase, V-phase and W-phase voltage command values Vu, Vv and Vw using a predicted angle that is obtained from the rotation angle θ of the rotary electric machine 10 and that is predicted as a position 1.5 control intervals later. The voltage command values Vu, Vv and Vw are converted to PWM signals by a PWM signal generating unit (not shown), and the PWM signals are output to the gate circuit (not shown). The gate circuit selects the switching elements Sw to which control signals are applied to thereby control on/off states of the switching elements Sw. In this way, the controller 38 converts stator currents flowing through the stator coils 28u, 28v and 28w into a dq-axis coordinate system to obtain a d-axis current component and a q-axis current component, and controls the inverter 36 so as to be able to obtain the respective phase stator currents corresponding to the target torque through vector control including feedback control.

Figure 5A:
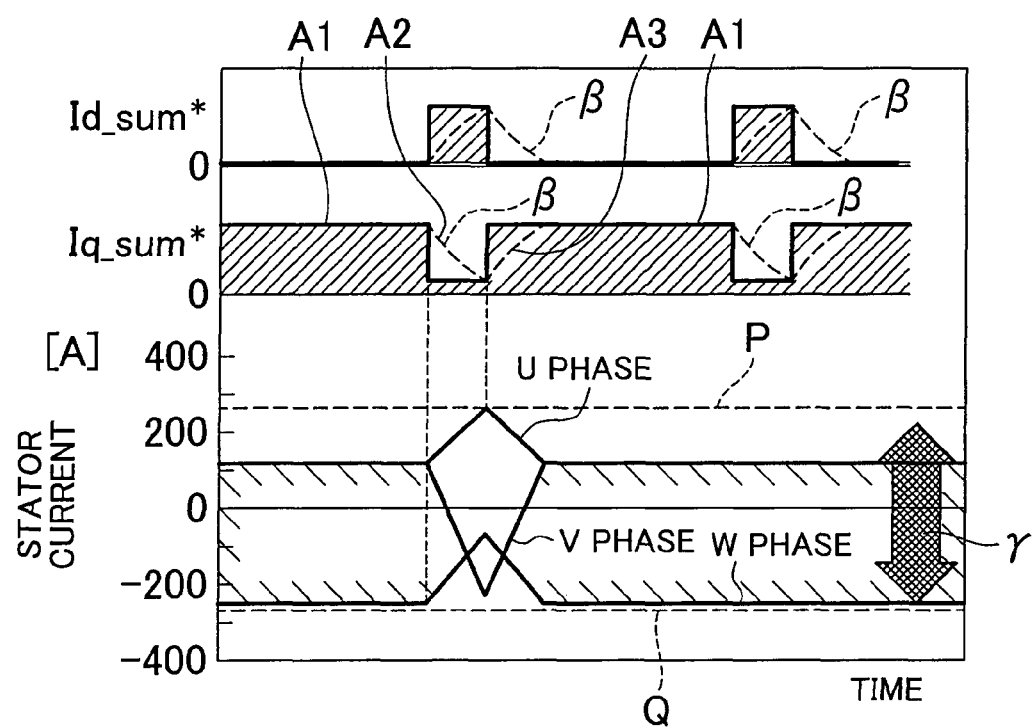
FIG. 5A is a time chart that shows an example of temporal variations in stator currents using a superimposed d-axis current command value Idsum*, a superimposed q-axis current command value Iqsum* and each phase current in the embodiment of the invention.
Figure 5B:
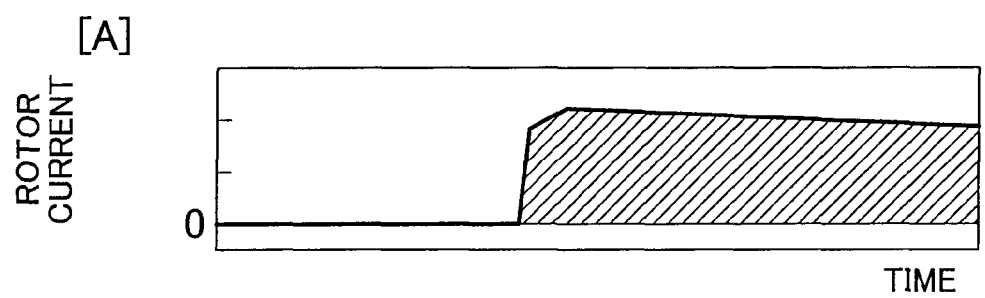
FIG. 5B is a time chart that shows a temporal variation in rotor current inducted in the rotor coils in correspondence with FIG. 5A.

FIG. 5A is a time chart that shows an example of temporal variations in stator currents using a superimposed d-axis current command value Idsum*, a superimposed q-axis current command value Iqsum* and each phase current in the embodiment. FIG. 5B is a time chart that shows a temporal variation in rotor current induced in the rotor coils in correspondence with FIG. 5A. Note that FIG. 5A and FIG. 5B show simulation results while an extremely short period of time is temporally expanded, that is, expanded in the horizontal direction in the drawings. Thus, actually, the U-phase, V-phase and W-phase currents respectively form sinusoidal waves when the rotary electric machine is driven; however, in FIG. 5A, those phase currents are shown linearly before and after pulse current is superimposed. Note that, in the following description, like reference numerals denote the same components as the elements shown in FIG. 1 to FIG. 4.

As shown in FIG. 5A, the decreasing/increasing pulse superimposing unit 72 shown in FIG. 4 superimposes increasing pulse current on the d-axis current command value Id* and superimposes decreasing pulse current on the q-axis current command value Iq* at the same time. For both the d-axis current command value Id* and the q-axis current command value Iq*, a current value on which no pulse current is superimposed is calculated in correspondence with a torque command. In this way, a current command that decreases and then increases in a pulse-shaped manner at set intervals is superimposed on the q-axis current command value Iq* by the decreasing/increasing pulse superimposing unit 72, and a current command that increases and then decreases in a pulse-shaped manner is superimposed on the d-axis current command value Id* by the decreasing/increasing pulse superimposing unit 72. Note that, even when pulse current is instructed as a rectangular waveform as shown in FIG. 5A, pulse current may actually have a pulse-shaped form that combines curves as indicated by the broken lines β because of a delay in response. In addition, the pulse-shaped waveform of each of the increasing pulse current and the decreasing pulse current may be any of a rectangular wave, a triangular wave and a waveform formed from a plurality of curves and/or lines into a projecting shape.

Figure 6:
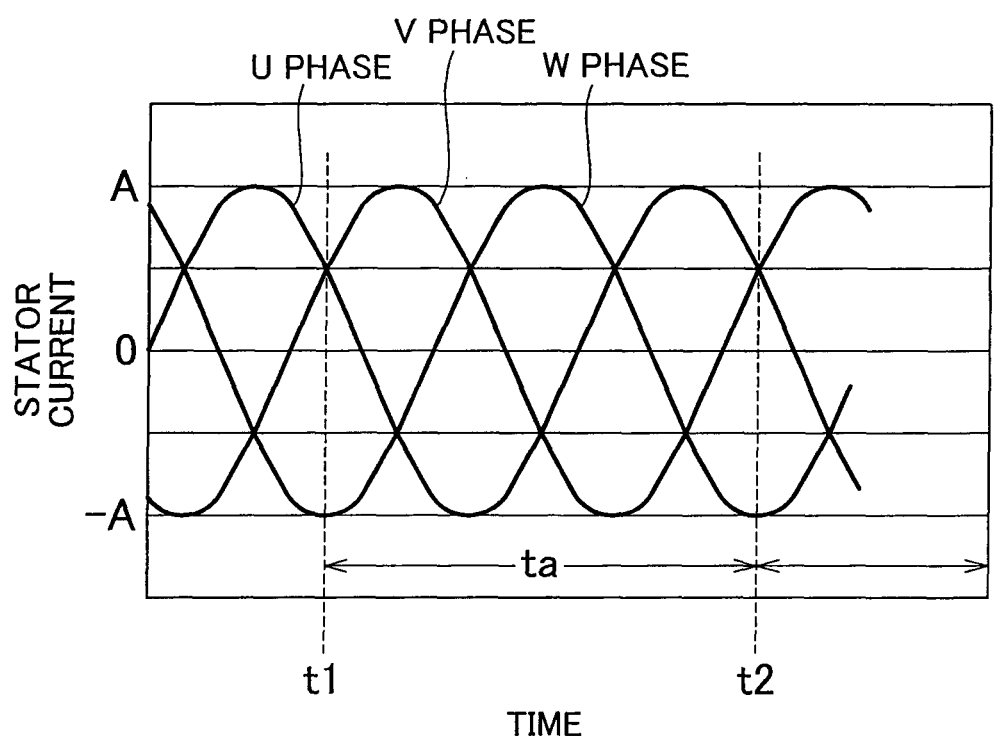
FIG. 6 is a time chart for illustrating time points t1 and t2 at which pulse current is started to be superimposed on three-phase stator currents in the embodiment of the invention.

When the pulse current is superimposed in this way, for example, a variation in current flowing through at least one-phase stator coil may be increased while suppressing the peak values of currents even when the maximum current flows through one-phase stator coil, equal currents respectively flow through the remaining two-phase stator coils and the sum of the equal currents flowing through the remaining two-phase stator coils flows through the one-phase stator coil. For example, the lower time chart of FIG. 5A shows the case where the maximum current flows through the W-phase stator coils 28w, equal currents respectively flow through the remaining two U-phase and V-phase stator coils 28u and 28v and the sum of the equal currents flowing through the remaining two-phase stator coils 28u and 28v flows through the W-phase stator coils 28w. FIG. 6 is a time chart for illustrating time points t1 and t2 at which pulse current is started to be superimposed on three-phase stator currents in the embodiment. As shown in FIG. 6, the phases of the three-phase stator currents are shifted by 120° from one another. In contrast to this, in FIG. 5A and FIG. 5B, pulse current is superimposed on the d-axis current command Id* and the q-axis current command Iq* at the instance of t1, t2, . . . , at which the W-phase stator current is minimal. Note that, in the following description, pulse current is superimposed at the time points t1 and t2 in FIG. 6; however, the embodiment does not intend to limit the timing at which pulse current is superimposed. In FIG. 6, pulse current is superimposed at set intervals ta.

In this case, the arrow γ indicates a current limit range, and the broken lines P and Q are the allowable current limits required in terms of design. That is, current values are required to fall between the broken lines P and Q on the basis of the relationship of the components, such as capability, of the inverter 36. Then, a current value that flows through the W-phase stator coils 28w is located near one of the allowable current limits. In this case, by superimposing increasing pulse current and decreasing pulse current, it is possible to increase a variation in at least one-phase (for example, V-phase) current while currents of all the phases are caused to fall within the required current limit range (γ range). Therefore, variations in magnetic fluxes of space harmonic components included in the revolving magnetic fields generated by the stator 12 increase with current variations. In this case, current that flows through the W-phase stator coils 28w and that is close to one of the allowable limits decreases toward the center of the current limit range, and current that flows through the U-phase stator coils 28u and that is far from the allowable limits increases but the amount of the increase may be reduced. Therefore, it is possible to increase induced currents that occur in the rotor coils 42n and 42s while preventing excessive currents from flowing through all the stator coils 28u, 28v and 28w. Moreover, the increasing pulse current Idp* is superimposed on the d-axis current command Id*, so it is possible to increase the amount of fluctuations in magnetic fluxes that pass through d-axis magnetic paths and that are generated by the d-axis current command Id*. The d-axis magnetic paths are able to reduce the passage of magnetic fluxes through a gap that is an air gap between the stator 12 and the rotor 14 as compared with the q-axis magnetic paths corresponding to the q-axis current command, so magnetic resistance decreases. Therefore, variations in magnetic fluxes of space harmonic components included in the revolving magnetic fields generated by the stator 12 increase with current variations. Thus, the rotor current increases as shown in FIG. 5B, and the motor torque increases. In addition, three-phase currents may be caused to fall within the current limit range (the arrow γ range in FIG. 5A). Thus, it is possible to increase induced currents induced in the rotor coils 42n and 42s even in a low rotation speed range while suppressing the peaks of stator currents of all the phases, so it is possible to increase the torque of the rotary electric machine 10.

Figure 7A:
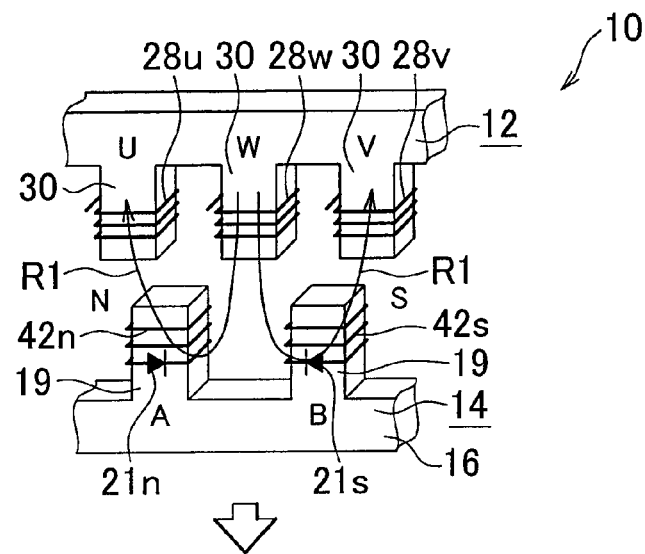
FIG. 7A is a schematic view that shows a state where magnetic fluxes pass through the stator and the rotor when q-axis current is a set value in the embodiment of the invention.
Figure 7B:
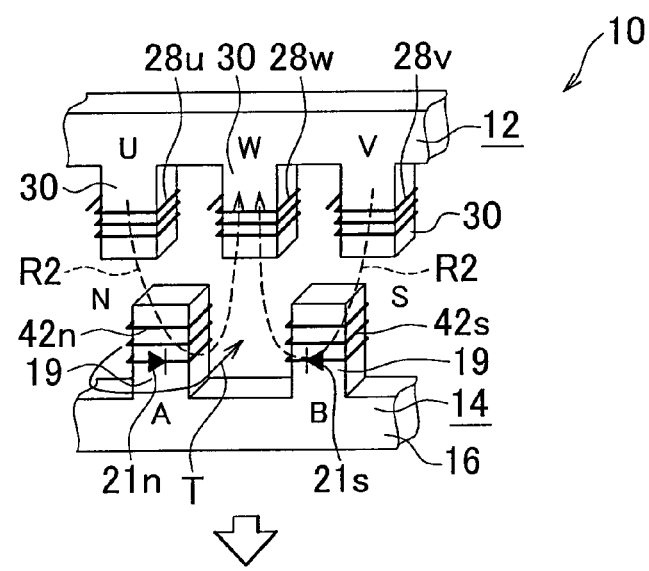
FIG. 7B is a schematic view that shows a state where magnetic fluxes pass through the stator and the rotor in a first-half period when decreasing pulse current is superimposed on q-axis current.
Figure 7C:
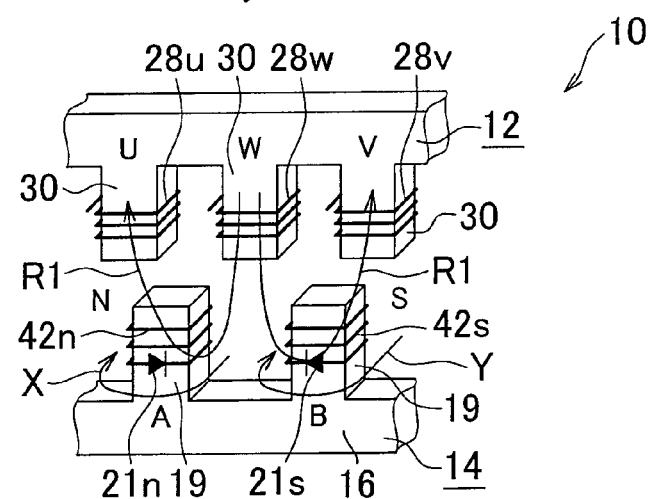
FIG. 7C is a schematic view that shows a state where magnetic fluxes pass through the stator and the rotor in a second-half period when decreasing pulse current is superimposed on q-axis current.
Figure 8:
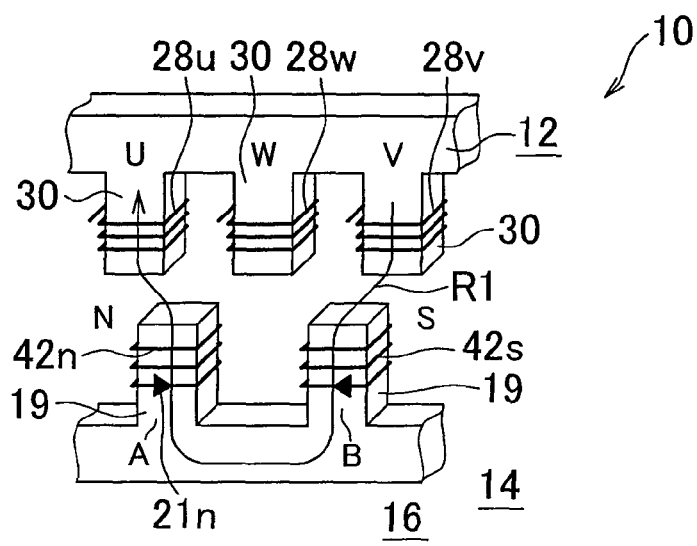
FIG. 8 is a schematic view that shows a state where magnetic fluxes pass through the stator and the rotor because of d-axis current in the embodiment of the invention.

This will be described in further detail with reference to FIG. 7A to FIG. 7C and FIG. 8. In FIG. 7A to FIG. 7C and FIG. 8, description will be made separately between variations in magnetic fluxes due to q-axis current (FIG. 7A to FIG. 7C) and variations in magnetic fluxes due to d-axis current (FIG. 8). FIG. 7A to FIG. 7C are schematic views that respectively show a state where magnetic fluxes pass through the stator and the rotor when the q-axis current is a set value, a state where magnetic fluxes pass through the stator and the rotor when decreasing pulse current is superimposed on the q-axis current in a first-half period and a state where magnetic fluxes pass through the stator and the rotor when decreasing pulse current is superimposed on the q-axis current in a second-half period in the embodiment. In each of FIG. 7A to FIG. 7C, the teeth 30 around which the three-phase stator coils 28u, 28v and 28w are wound do not radially face the teeth 19 around which the rotor coils 42n and 42s are wound, so one of the teeth 30 faces the center position between two adjacent teeth 19 in the circumferential direction of the rotor 14. In this state, as indicated by the solid arrows R1 and the broken arrows R2 in FIG. 7A to FIG. 7C, the magnetic fluxes passing through the stator 12 and the rotor 14 are q-axis magnetic fluxes.

FIG. 7A corresponds to the A1 state where the superimposed q-axis current command value Iqsum* is a set value in FIG. 5A. FIG. 7B corresponds to the state where decreasing pulse current is occurring in the superimposed q-axis current command value Iqsum* in a first-half period, that is, the A2 state where Iqsum* steeply decreases, in FIG. 5A. In addition, FIG. 7C corresponds to the state where decreasing pulse current is occurring in the superimposed q-axis current command value Iqsum* in a second-half period, that is, the A3 state where Iqsum* steeply increases, in FIG. 5A.

First, as shown in FIG. 7A, in the state where the superimposed q-axis current command value Iqsum* is a set value before decreasing pulse current occurs, magnetic fluxes pass from the W-phase tooth 30 through the "A" and "B" teeth 19 via the space between the "A" and "B" teeth 19 and then to the U-phase and V-phase teeth 30. In this case, positive currents flow through the U-phase and V-phase stator coils 28u and 28v and large negative current flows through the W-phase stator coil 28w. However, in this case, variations in magnetic fluxes due to the fundamental that passes through each of the teeth 30 do not occur.

In contrast to this, as shown in FIG. 7B, in the state where decreasing pulse current is occurring in the first-half period, that is, the state where q-axis current steeply decreases, the magnitude of current that flows through each of the stator coils 28u, 28v and 28w varies to decrease, and, apparently, magnetic fluxes pass in the opposite direction because of a change from FIG. 7A as indicated by the broken arrows R2. Note that, for the variations in magnetic fluxes, the signs of the stator current values may be inverted such that the magnetic fluxes actually pass in the direction opposite to that of FIG. 7A. In any case, the magnetic flux passes in the direction to change from the north pole to the south pole in the tooth 19 of "A", induced current attempts to flow through the rotor coil 42n in the direction to prevent the passage of the magnetic flux, and passage of the induced current in the arrow T direction in FIG. 7B is not blocked by the diode 21n. In contrast to this, the magnetic flux passes in the direction to enhance the south pole in the tooth 19 of "B", and induced current attempts to flow through the rotor coil 42s in the direction to prevent the passage of the magnetic flux, that is, the direction to change the tooth 19 of "B" into the north pole; however, the flow of induced current in that direction is blocked by the diode 21s, so current does not flow in "B".

Subsequently, as shown in FIG. 7C, in a state where decreasing pulse current is occurring in the second-half period, that is, in a state where q-axis current steeply increases, the magnitude of current that flows through each of the stator coils 28u, 28v and 28w varies to increase and then magnetic fluxes pass in the direction opposite to that of FIG. 7B, as indicated by the solid arrows R1. In this case, the magnetic flux passes in the direction to enhance the north pole in the tooth 19 of "A" and induced current attempts to flow through the rotor coil 42n in the direction to prevent the passage of the magnetic flux, that is, the direction to change the tooth 19 of "A" into the south pole (X direction opposite to that of the diode 21n); however, current has already been flowing in FIG. 7B, so the current gradually reduces for at least a certain period of time but flows in the direction opposite to the X direction. In addition, the magnetic flux passes in the direction to change the south pole to the north pole in the tooth 19 of "B", induced current attempts to flow through the rotor coil 42s in the direction to prevent the passage of the magnetic flux, and the flow of the induced current in the arrow Y direction in FIG. 7C is not blocked by the diode 21s.

In addition, as the decreasing pulse current becomes 0 and returns to the state of FIG. 7A again, currents flowing through the rotor coils 42n and 42s gradually decrease. Variations in q-axis magnetic fluxes when decreasing pulse current is superimposed on the q-axis current are described above; however, increasing pulse is superimposed on the d-axis current at the same timing as the timing at which decreasing pulse current is superimposed. In this case, d-axis magnetic fluxes pass as shown in FIG. 8. FIG. 8 is a schematic view that shows a state where magnetic fluxes pass through the stator 12 and the rotor 14 because of d-axis current in the embodiment. That is, d-axis magnetic fluxes pass as indicated by the arrow R3 in FIG. 8 because of d-axis currents of the stator coils 28u, 28v and 28w. The arrow R3 in FIG. 8 indicates the flow in the forward direction of the d-axis magnetic fluxes. The d-axis magnetic fluxes pass from the V-phase tooth 30 through the "B" tooth 19, the back yoke of the rotor core 16 and the "A" tooth 19 toward the U-phase tooth 30. In this way, the d-axis magnetic paths through which the d-axis magnetic fluxes pass do not pass through a large air gap, different from the case of the q-axis magnetic paths through which the q-axis magnetic fluxes pass as shown in FIG. 7A to FIG. 7C, so a large amount of magnetic fluxes are allowed to pass therethrough, so variations in magnetic fluxes may be increased. In addition, as increasing pulse current is superimposed on the d-axis current as shown in FIG. 5A, the passage of d-axis magnetic fluxes due to the d-axis current steeply increases and then steeply decreases. Thus, as is apparent from FIG. 7B, FIG. 7C and FIG. 8, when d-axis magnetic fluxes and q-axis magnetic fluxes both are taken into consideration, the V-phase stator current significantly decreases and then increases to return, and the U-phase stator current increases with a low rate of increase and then decreases to return. As a result, pulse current is superimposed to vary the three-phase stator currents as shown in FIG. 5A, and it is possible to increase a variation in the V-phase stator current while the stator currents of all the phases are caused to fall within the current limit range, so it is possible to increase the torque of the rotary electric machine 10.

Figure 9:
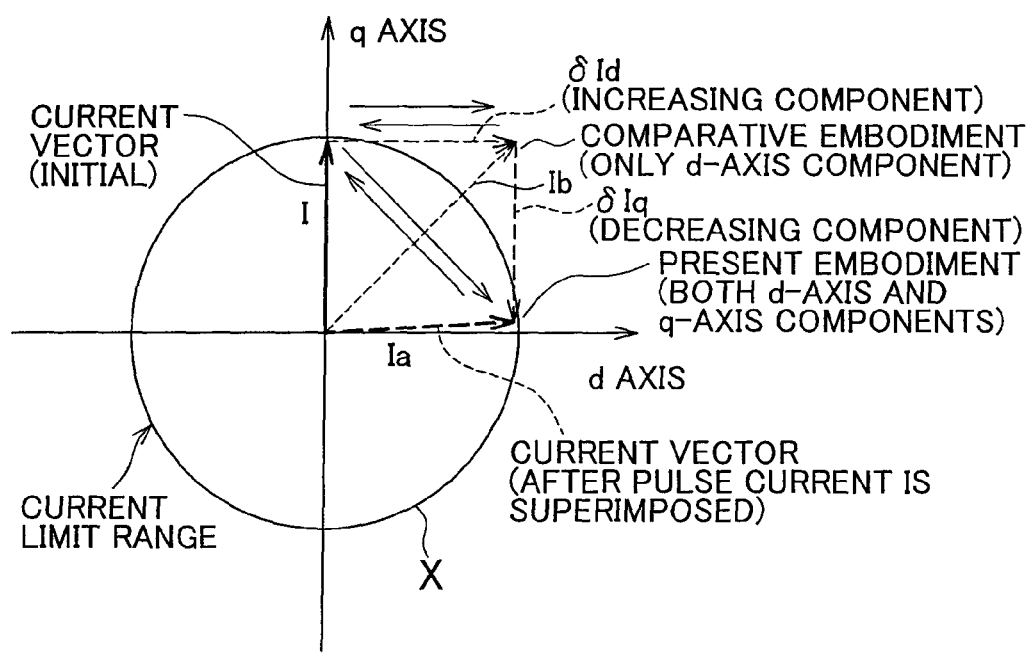
FIG. 9 is a graph that shows current vectors before and after pulse current is superimposed in the embodiment of the invention.

FIG. 9 is a graph that shows current vectors before and after pulse current is superimposed in the embodiment. FIG. 9 shows current vectors of stator currents in dq coordinate system. In FIG. 9, the current vector I shows an example of an initial current vector before pulse current determined from a target torque, and the like, is superimposed. In addition, the current vector Ia is a current vector that is obtained in such a manner that, in the initial current vector, increasing pulse current is superimposed on d-axis current and decreasing pulse current is superimposed on q-axis current. The current vector varies as pulse current is superimposed in this way. However, in that case as well, in the present embodiment, decreasing pulse current is superimposed on the q-axis current command and increasing pulse current is superimposed on the d-axis current command such that the current vector Ia after pulse current is superimposed on stator currents falls within a control circle X drawn by the distal end of the initial current vector. Therefore, stator currents may be caused to fall within the current limit range. In contrast to this, the current vector Ib shows a current vector of the configuration according to a comparative embodiment in which only increasing pulse current is superimposed on d-axis current and no pulse current is superimposed on q-axis current. In this case, it is apparent that the current vector Ib extends from the control circle and stator currents exceed the current limit range.

In this way, in the present embodiment, the decreasing/increasing pulse superimposing unit 72 of the controller 38 superimposes decreasing pulse current on the q-axis current command and superimposes increasing pulse current on the d-axis current command such that the current vector Ia after pulse current is superimposed on stator currents falls within the control circle drawn by the distal end of the initial current vector defined in dq coordinate system when no pulse current is superimposed on stator currents. Therefore, the decreasing/increasing pulse generating unit 84 shown in FIG. 4 determines the increasing pulse current Idp* and the decreasing pulse current Iqp* on the basis of the current torque and rotation speed of the rotary electric machine 10.

Figure 10:
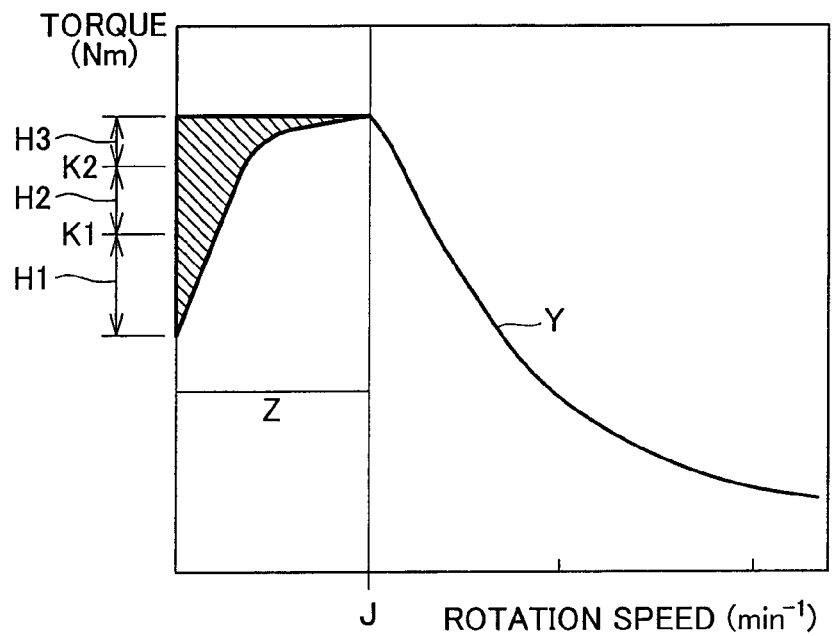
FIG. 10 is a graph that shows the correlation between the rotation speed and torque of the rotary electric machine for illustrating an example in which a pulse current superimposed state is changed in the embodiment of the invention.

FIG. 10 is a graph that shows the correlation between the rotation speed and torque of the rotary electric machine for illustrating an example in which a pulse current superimposed state is changed in the embodiment. As shown in FIG. 10, in the present embodiment, the mode in which pulse current is superimposed may be changed in three steps on the basis of the range of the rotation speed and torque of the rotary electric machine 10. FIG. 10 shows the correlation between the rotation speed and torque of the rotary electric machine 10 when no pulse current is superimposed in the present embodiment. Therefore, in the range in which the rotation speed is low, indicated by the arrow Z, there is a possibility that the torque of the rotary electric machine 10 decreases because of the reason described in Summary of the Invention. Thus, it has been desired to increase torque in the shaded area of FIG. 10 in the related art. In contrast to this, in the present embodiment, when the correlation between a torque and a rotation speed is defined in an H1 region, an H2 region and an H3 region, pulse current is superimposed on at least one of d-axis current and q-axis current in different modes corresponding to the respective regions.

First, in the H1 region, that is, when the rotation speed of the rotor 14 is lower than or equal to a predetermined rotation speed (J min$^{-1}$) and the output torque of the rotary electric machine 10 is lower than or equal to a threshold (K1 Nm), the decreasing/increasing pulse superimposing unit 72 executes an increasing pulse mode in which increasing pulse current Idp* is superimposed on the d-axis current command Id* but decreasing pulse current is not superimposed on the q-axis current command Iq*. When there is an allowance from the current limits in this way, the increasing pulse mode that uses only variations in d-axis magnetic fluxes is able to efficiently induce rotor currents.

In contrast to this, in the H2 region, that is, when the rotation speed of the rotor 14 is lower than or equal to the predetermined rotation speed (J min$^{-1}$) and the output torque of the rotary electric machine 10 is higher than the threshold (K1 Nm) and lower than or equal to a second threshold (K2 Nm), the decreasing/increasing pulse superimposing unit 72 executes an decreasing/increasing pulse mode in which increasing pulse current Idp* is superimposed on the d-axis current command Id* and decreasing pulse current Iqp* is superimposed on the q-axis current command Iq*. When there is a small allowance from the current limits in this way, the decreasing/increasing pulse mode that uses variations in d-axis magnetic fluxes and variations in q-axis magnetic fluxes is able to induce rotor currents within the range of the current limits.

In addition, in the H3 region, that is, when the rotation speed of the rotor 14 is lower than or equal to the predetermined rotation speed (J min$^{-1}$) and the output torque of the rotary electric machine 10 exceeds the second threshold (K2 Nm), the decreasing/increasing pulse superimposing unit 72 executes a decreasing pulse mode in which decreasing pulse current Iqp* is superimposed on the q-axis current command Iq* but increasing pulse current is not superimposed on the d-axis current command Id*. When it becomes close to the current limits in this way, the decreasing pulse mode that uses only variations in q-axis magnetic fluxes is used, so all the three-phase stator currents are varied toward the center of the current limit range to make it possible to increase torque while preventing an increase in current.

Note that the mode in which pulse current is superimposed is changed in three steps, that is, the H1 region, the H2 region and the H3 region, in the above description; instead, the mode in which pulse current is superimposed may be changed in two steps, that is, the H1 region and the H2 region. In this case, the decreasing/increasing pulse superimposing unit 72 executes the increasing pulse mode in which increasing pulse current is superimposed on the d-axis current command but decreasing pulse current is not superimposed on the q-axis current command when the rotation speed of the rotor 14 is lower than or equal to the predetermined rotation speed and the output torque is lower than or equal to a threshold, and executes the decreasing/increasing pulse mode in which increasing pulse current is superimposed on the d-axis current command and decreasing pulse current is superimposed on the q-axis current command when the output torque exceeds the threshold. Note that, when the mode in which pulse current is superimposed is changed in the above three steps or two steps, the mode in which pulse current is superimposed may be changed on the basis of the output torque without defining the condition of the rotation speed.

With the above rotary electric machine driving system, it is possible to implement the rotary electric machine that is able to increase torque even in a low rotation speed range while preventing excessive currents from flowing through all the stator coils 28u, 28v and 28w. That is, by superimposing decreasing pulse current on the q-axis current command and superimposing increasing pulse current on the d-axis current command, it is possible to increase induced currents that occur in the rotor coils 42n and 42s while currents of all the phases are caused to fall within the required current limit range. In addition, increasing pulse current is superimposed on the d-axis current command, so it is possible to increase the amount of fluctuations in magnetic fluxes that pass through the d-axis magnetic paths generated by the d-axis current command. The d-axis magnetic paths are able to reduce the passage of magnetic fluxes through an air gap as compared with the q-axis magnetic paths corresponding to the q-axis current command, so magnetic resistance decreases. Therefore, increasing the amount of fluctuations in d-axis magnetic fluxes is effective at increasing torque. Thus, it is possible to increase induced currents induced in the rotor coils 42n and 42s even in a low rotation speed range while suppressing the peaks of stator currents of all the phases, so it is possible to increase the torque of the rotary electric machine 10. Therefore, this, for example, prevents an increase in the capacity of each switching element of the inverter 36, so it is possible to reduce the cost and size of a control system, including the inverter 36. In addition, it is not necessary to expand the detection range of each current sensor for current control, so it is possible to reduce the size of each sensor and effectively increase the detection accuracy of each sensor. In addition, it is not necessary to provide magnets for the rotor 14, so a magnetless and high-torque configuration may be achieved.

In contrast to this, in the case of the synchronous machine described in JP-A-2007-185082, electromagnets are formed of the rotor using pulse current; however, the rotor coils are provided at the outer peripheral portion of the rotor so as to span in the radial direction, and one rectifier element is connected to each rotor coil to form two different magnetic poles at the opposite sides in the radial direction of the rotor. Therefore, induced currents for forming two magnetic poles cancel each other even when pulse is superimposed on q-axis current, so induced currents cannot be generated in the rotor coils. That is, with this configuration, it is impossible to generate torque by superimposing pulse current on the q-axis current.

In addition, in the case of the synchronous machine described in JP-A-2010-98908, increasing pulse current that increases and then decreases in a pulse-shaped manner is superimposed on d-axis current and q-axis current, so the peaks of currents that flow through the stator coils may excessively increase. In addition, in the case of the synchronous machine described in JP-A-2010-110079, for the purpose of implementing the rotary electric machine that is able to increase torque even in a low rotation speed range while preventing excessive currents from flowing through the stator coils, no device for superimposing decreasing pulse current on q-axis current is described.

In addition, in the present embodiment, the width θ of each of the rotor coils 42n and 42s in the circumferential direction of the rotor 14 is regulated as described in the above mathematical expression (1), so it is possible to increase induced electromotive forces due to the space harmonics of the revolving magnetic fields, which are generated in the rotor coils 42n and 42s. That is, the amplitude (fluctuation width) of magnetic fluxes that link with the rotor coils 42n and 42s due to space harmonics is influenced by the width θ of each of the rotor coils 42n and 42s in the circumferential direction. Here, FIG. 3B shows the result of calculating the amplitude (fluctuation width) of magnetic fluxes that link with the rotor coils 42n and 42s while varying the width θ of each of the rotor coils 42n and 42s in the circumferential direction. FIG. 3B shows the coil width θ in electric angle. As shown in FIG. 3B, as the coil width θ reduces from 180°, the fluctuation width of magnetic fluxes that link with the rotor coils 42n and 42s increases, so the coil width θ is made smaller than 180°, that is, the rotor coils 42n and 42s are formed by short pitch winding, to thereby make it possible to increase the amplitude of linked magnetic fluxes due to space harmonics as compared with full pitch winding.

Thus, in the rotary electric machine 10 (FIG. 2), the width of each of the teeth 19 in the circumferential direction is made smaller than the width corresponding to 180° in electric angle, and the rotor coils 42n and 42s are wound around the corresponding teeth 19 by short pitch winding to thereby make it possible to efficiently increase induced electromotive forces due to space harmonics, which are generated in the rotor coils 42n and 42s. As a result, torque that acts on the rotor 14 may be efficiently increased.

Furthermore, as shown in FIG. 3B, when the coil width θ is 90°, the amplitude of linked magnetic fluxes due to space harmonics is maximal. Thus, in order to further increase the amplitude of magnetic fluxes that link with the rotor coils 42n and 42s due to space harmonics, the width θ of each of the rotor coils 42n and 42s in the circumferential direction is desirably equal to (or substantially equal to) the width corresponding to 90° in electric angle of the rotor 14. Therefore, where the number of pole pairs of the rotor 14 is p and the distance from the rotation central axis of the rotor 14 to each of the rotor coils 42n and 42s is r, the width θ of each of the rotor coils 42n and 42s in the circumferential direction desirably satisfies (or substantially satisfies) the following mathematical expression (2).

$$\theta = \pi \times r / (2 \times p) \qquad (2)$$

By so doing, induced electromotive forces due to space harmonics, which are generated in the rotor coils 42n and 42s, may be maximized, and magnetic fluxes that are generated in the respective teeth 19 because of induced currents may be most efficiently increased. As a result, it is possible to further efficiently increase torque that acts on the rotor 14. That is, when the width θ significantly exceeds the width corresponding to 90°, magnetomotive forces in the directions to cancel each other tend to link with the rotor coils 42n and 42s; however, the possibility of occurrence of those magnetomotive forces decreases as the width θ becomes smaller than the width corresponding to 90°. However, when the width θ significantly reduces with respect to the width corresponding to 90°, the magnitudes of magnetomotive forces that link with the rotor coils 42n and 42s significantly decrease. Therefore, the width θ is set to the width corresponding to about 90° to thereby make it possible to prevent such inconvenience. Therefore, the width θ of each of the rotor coils 42n and 42s in the circumferential direction is desirably substantially equal to the width corresponding to 90° in electric angle.

In this way, in the present embodiment, when the width θ of each of the rotor coils 42n and 42s in the circumferential direction of the rotor 14 is substantially equal to the width corresponding to 90° in electric angle, induced electromotive forces due to the space harmonics of the revolving magnetic fields, which are generated in the rotor coils 42n and 42s, may be increased, so it is possible to most efficiently increase the magnetic fluxes of the teeth 19 that are magnetic pole portions. The magnetic fluxes of the teeth 19 are generated by induced currents flowing through the rotor coils 42n and 42s. As a result, it is possible to further efficiently increase torque that acts on the rotor 14. Note that, in the present embodiment, the rotor 14 is configured such that any adjacent rotor coils 42n and 42s in the circumferential direction are electrically isolated from each other, the rotor coils 42n arranged alternately in the circumferential direction are electrically connected in series with one another and the rotor coils 42s arranged alternately in the circumferential direction are electrically connected in series with one another. However, in the present embodiment, it is also applicable that, as in the case of the configuration shown in FIG. 23 to FIG. 25, the rotary electric machine includes the rotor 14, in which any one of the diodes 21n and 21s is connected to each of the rotor coils 42n and 42s that are wound around the corresponding teeth 19 and the rotor coils 42n and 42s are electrically isolated from each other, and the controller 38 has the decreasing/increasing pulse superimposing unit 72 (FIG. 4).

Figure 11:
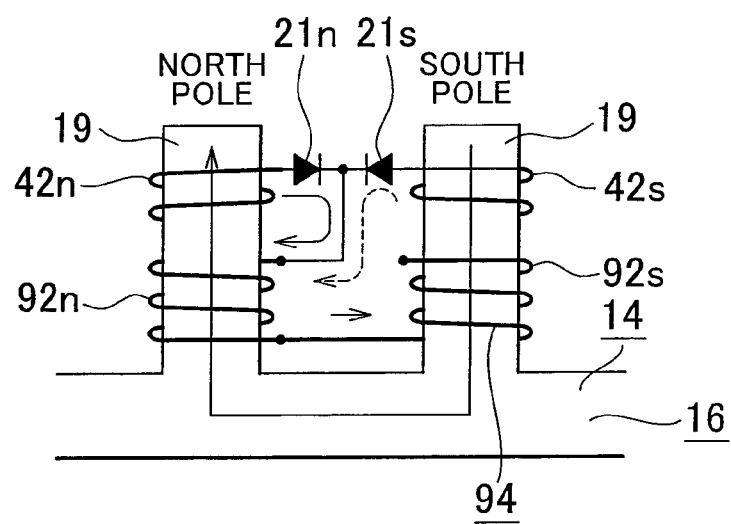
FIG. 11 is a view that shows another embodiment of the invention and that corresponds to FIG. 3A.
Figure 12:
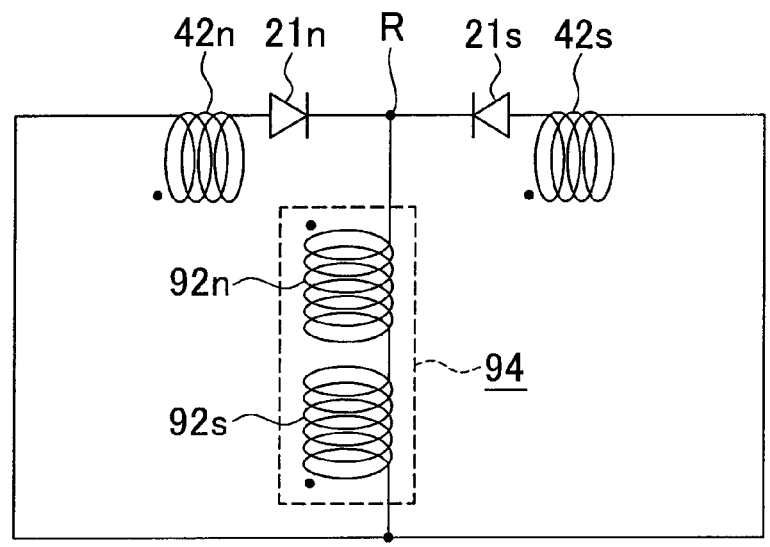
FIG. 12 is a view that shows an equivalent circuit of rotor coils and rotor auxiliary coils in the embodiment of FIG. 11.

Next, FIG. 11 is a view that shows another embodiment of the invention and that corresponds to FIG. 3A. In addition, FIG. 12 is a view that shows an equivalent circuit of rotor coils and rotor auxiliary coils in the embodiment of FIG. 11. In the rotary electric machine according to the embodiment shown in FIG. 11, different from the embodiment shown in FIG. 1 to FIG. 8, the teeth 19 of the rotor 14 are provided with not only the rotor coils 42*n* and 42*s* wound around the distal end sides but also auxiliary rotor coils 92*n* and 92*s* wound around the proximal end sides. That is, in the present embodiment, as in the case of the embodiment shown in FIG. 1 to FIG. 8, the rotor core 16 includes the teeth 19. The teeth 19 are arranged at intervals in the circumferential direction of the rotor 14. The teeth 19 are a plurality of magnetic pole portions and salient portions that protrude toward the stator 12 (see FIG. 2). In addition, the teeth 19 are magnetized as currents rectified by the diodes 21*n* and 21*s* flow through the rotor coils 42*n* and 42*s* and the auxiliary rotor coils 92*n* and 92*s* to thereby function as magnets having fixed magnetic poles. In addition, the auxiliary rotor coils 92*n* and 92*s* are wound around the proximal end sides of the corresponding teeth 19, and are respectively wound around any adjacent teeth 19 in the circumferential direction of the rotor 14. Any two of the auxiliary rotor coils 92*n* and 92*s* are connected in series with each other to constitute an auxiliary coil set 94.

In addition, one ends of any adjacent two of the rotor coils 42*n* and 42*s*, wound around any adjacent two of the teeth 19 in the circumferential direction of the rotor 14, are connected to each other at a connection point R (FIG. 12) via the respectively corresponding diodes 21*n* and 21*s* such that the respectively corresponding diodes 21*n* and 21*s* face each other in opposite directions. In addition, the other ends of the any adjacent two of the rotor coils 42*n* and 42*s* in the circumferential direction of the rotor 14 each are connected to one end of the auxiliary coil set 94, and the connection point R is connected to the other end of the auxiliary coil set 94.

With such a configuration, rectified currents respectively flow through the rotor coils 42*n* and 42*s* and the auxiliary rotor coils 92*n* and 92*s* to magnetize the teeth 19 and to cause the teeth 19 to function as magnetic pole portions. That is, by passing alternating currents through the stator coils 28*u*, 28*v* and 28*w*, revolving magnetic fields that include space harmonics component act from the stator 12 (FIG. 2) on the rotor 14. Owing to fluctuations in magnetic fluxes of space harmonic components, fluctuations in leakage magnetic fluxes that leak into the space between the teeth 19 of the rotor 14 occur, and, by so doing, induced electromotive forces are generated. In addition, it is possible to mainly impart the function of generating induced currents to the rotor coils 42*n* and 42*s* at the distal end sides of the teeth 19 and to mainly impart the function of magnetizing the teeth 19 to the auxiliary rotor coils 92*n* and 92*s*. In addition, the total of currents flowing through the rotor coils 42*n* and 42*s* wound around any adjacent teeth 19 becomes current flowing through the auxiliary rotor coils 92*n* and 92*s*. In addition, any adjacent auxiliary rotor coils 92*n* and 92*s* are connected in series with each other, so the same advantageous effect as that when the number of turns of both adjacent auxiliary rotor coils 92*n* and 92*s* is increased may be obtained, and it is possible to reduce currents flowing through the rotor coils 42*n* and 42*s* and the auxiliary rotor coils 92*n* and 92*s* while magnetic fluxes passing through the teeth 19 are unchanged. The other configuration and operation are similar to those of the embodiment shown in FIG. 1 to FIG. 8.

Figure 13:
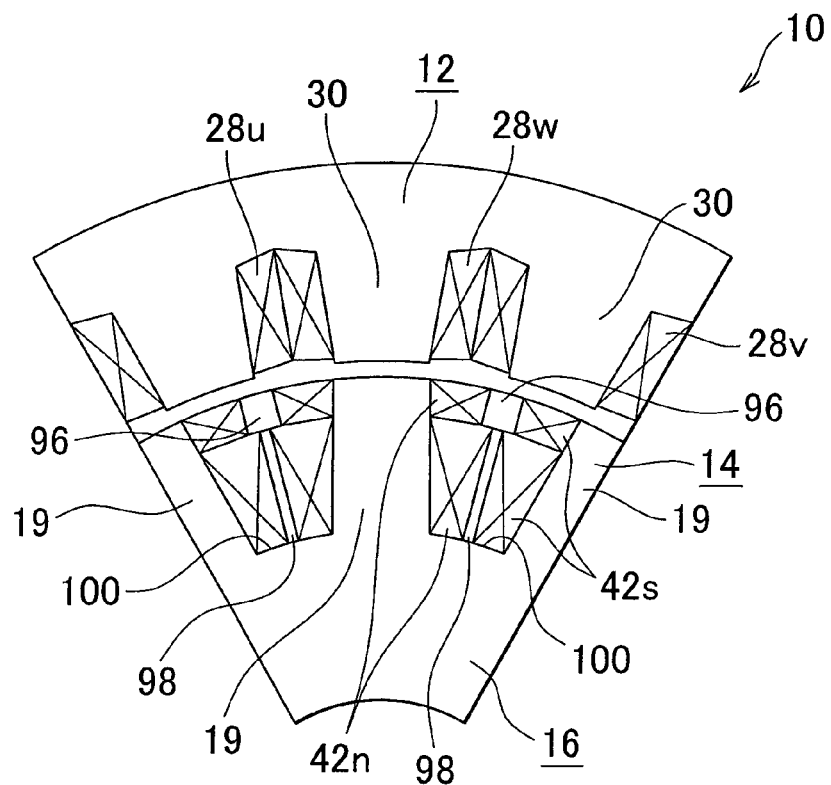
FIG. 13 is a partially schematic cross-sectional view that shows a portion at which a stator faces a rotor in another embodiment of the invention.

Next, FIG. 13 is a schematic cross-sectional view that partially shows a portion at which a stator faces a rotor in another embodiment of the invention. A rotary electric machine 10 according to the present embodiment differs from the embodiment shown in FIG. 1 to FIG. 8 or the embodiment shown in FIG. 11 and FIG. 12 in that an auxiliary pole 96 formed of a magnetic material is provided between any adjacent teeth 19 in the circumferential direction of the rotor 14. In addition, each auxiliary pole 96 is coupled to the distal end portion of a pillar portion 98 made of a non-magnetic material. The proximal portion of each pillar portion 98 is coupled to the center in the circumferential direction at the bottom of a slot 100 between any adjacent teeth in the circumferential direction on the outer peripheral surface of the rotor core 16. Note that, on the condition that each pillar portion 98 is formed of a magnetic material and the strength of the pillar portion 98 may be ensured, the cross-sectional area of the pillar portion 98 in the circumferential direction of the rotor 14 may be sufficiently reduced.

With the above configuration, magnetic paths through which space harmonic components pass may be easily formed at portion including the auxiliary poles 96, so a large amount of space harmonics included in the revolving magnetic fields generated by the stator 12 are caused to pass through the auxiliary poles 96 to thereby make it possible to increase fluctuations in magnetic fluxes of space harmonics. Therefore, induced currents that occur in the rotor coils 42*n* and 42*s* are further increased to thereby make it possible to further increase the torque of the rotary electric machine 10. The other configuration and operation are similar to those of the embodiment shown in FIG. 1 to FIG. 8.

Next, other configuration examples of a rotary electric machine that constitutes the rotary electric machine driving system according to the above described embodiments will be described. As described below, the aspect of the invention may be applied to various configuration examples of the rotary electric machine.

Figure 14:
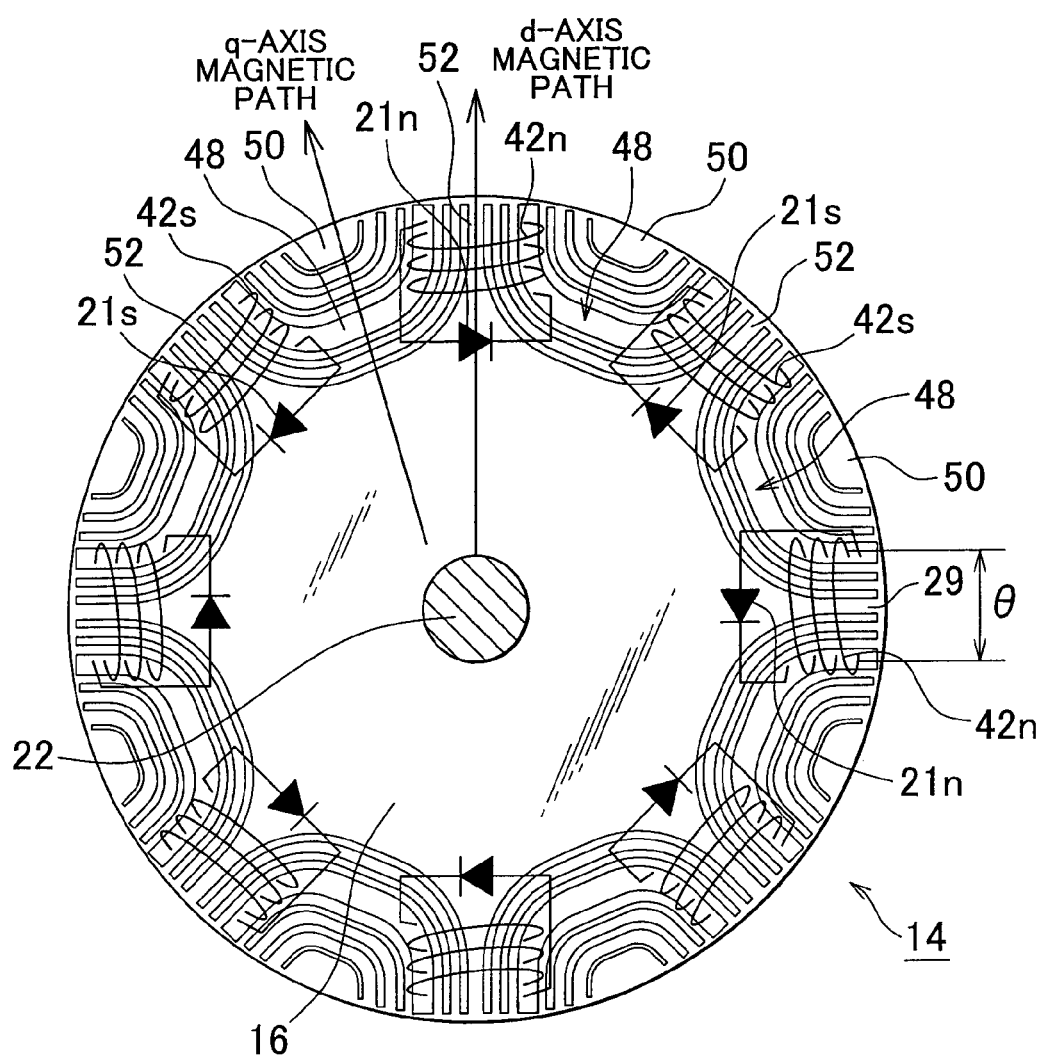
FIG. 14 is a schematic view that shows a rotor of another configuration example of the rotary electric machine that constitutes the embodiment of the invention.

For example, in the above described embodiments, the rotor coils 42*n* and 42*s* are wound around the corresponding teeth 19 that are salient poles protruding in the radial direction of the rotor 14; instead, it is also applicable that, as shown in FIG. 14, slits (airspaces) 48 that are rotor slots are formed in the rotor core 16 to thereby vary the magnetic resistance of the rotor 14 in accordance with the rotation direction. As shown in FIG. 14, in the rotor core 16, where each magnetic path of the circumferential center of a portion that is formed so as to arrange the plurality of slits 48 in the radial direction is a q-axis magnetic path portion 50 and each magnetic path in the direction along the magnetic pole portion at which the rotor coil is arranged is a d-axis magnetic path portion 52, the slits 48 are formed such that the q-axis magnetic path portion 50 and the d-axis magnetic path portion 52 facing the stator 12 (teeth 30) are arranged alternately in the circumferential direction, and each q-axis magnetic path portion 50 is located between any adjacent d-axis magnetic path portions 52 in the circumferential direction.

Each of the rotor coils 42*n* and 42*s* is wound through the slits 48 around a corresponding one of the d-axis magnetic path portions 52 having a low magnetic resistance. In this case, the slits 48 are formed in the rotor core 16 at intervals in the circumferential direction around the rotation axis of the rotor 14, and the rotor coils 42*n* and 42*s* are wound at multiple portions in the circumferential direction on the outer peripheral portion of the rotor core 16 so as to be partially arranged in the slits 48. In the configuration example shown in FIG. 14, the revolving magnetic fields that include space harmonic components and that are formed in the stator 12 link with the rotor coils 42n and 42s to cause direct currents rectified by the diodes 21n and 21s to flow through the rotor coils 42n and 42s to thereby magnetize the d-axis magnetic path portions 52. As a result, the d-axis magnetic path portions 52 function as magnets (magnetic pole portions) having fixed magnetic poles. At this time, the width of each d-axis magnetic path portion 52 (the width θ of each of the rotor coils 42n and 42s) in the circumferential direction is set so as to be shorter than the width corresponding to 180° in electric angle of the rotor 14, and the rotor coils 42n and 42s are wound around the corresponding d-axis magnetic path portions 52 by short pitch winding. By so doing, it is possible to efficiently increase induced electromotive forces due to space harmonics, which are generated in the rotor coils 42n and 42s. Furthermore, in order to maximize induced electromotive forces due to space harmonics, which are generated in the rotor coils 42n and 42s, the width θ of each of the rotor coils 42n and 42s in the circumferential direction is desirably equal (or substantially equal to) the width corresponding to 90° in electric angle of the rotor 14. The other configuration and operation are similar to those of the above described embodiments.

Figure 15:
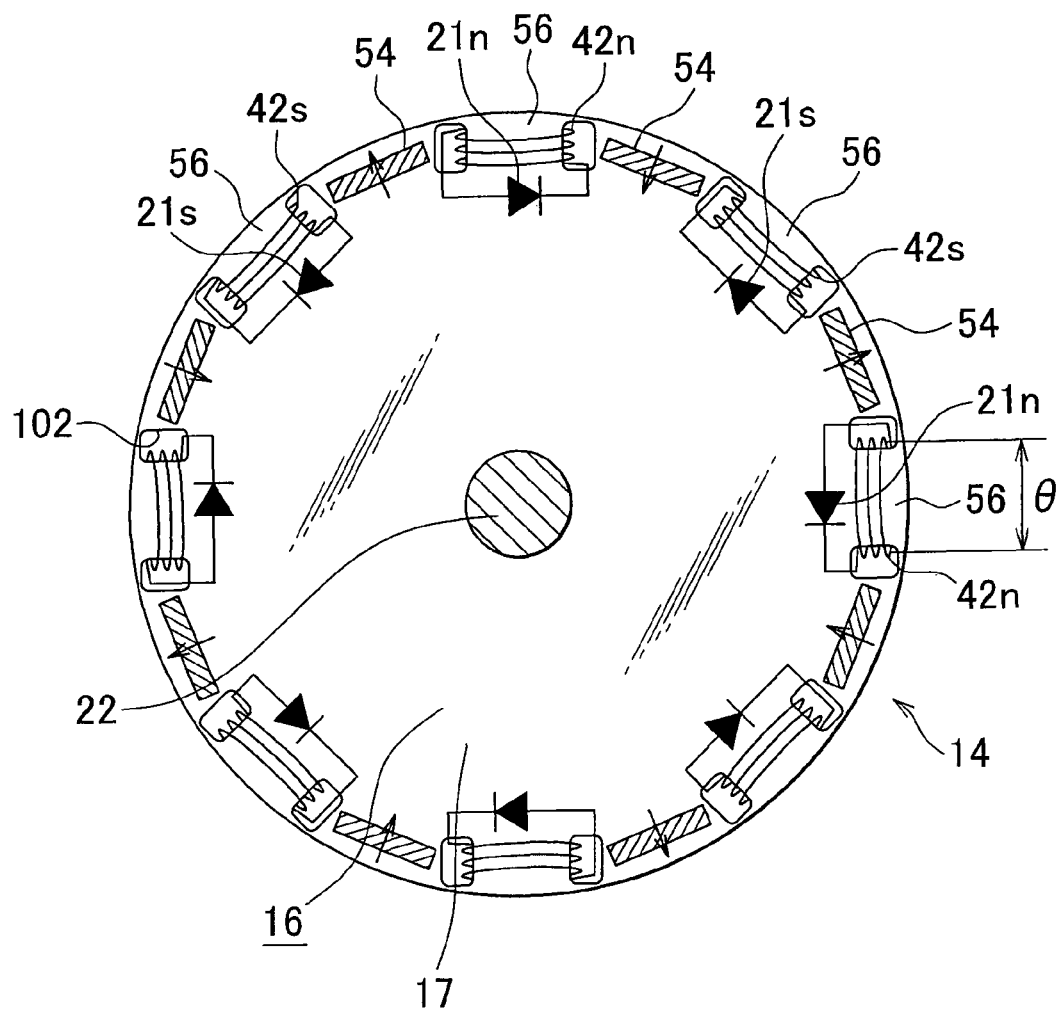
FIG. 15 is a schematic view that shows a rotor of another configuration example of the rotary electric machine that constitutes the embodiment of the invention.

In addition, in the above described embodiments, for example as shown in FIG. 15, it is also applicable that the rotor core 16 includes a rotor core body 17 made of a magnetic material and a plurality of permanent magnets 54 and the permanent magnets 54 are arranged on the rotor core 16. In the configuration example shown in FIG. 15, a plurality of magnetic pole portions 56 that function as magnets having fixed magnetic poles are arranged so as to face the stator 12 (see FIG. 2) at intervals in the circumferential direction, and the rotor coils 42n and 42s are wound around the corresponding magnetic pole portions 56. In this case, slits 102 that are rotor slots are formed at multiple portions of the rotor core 16 in the circumferential direction, and the rotor coils 42n and 42s are wound at multiple portions in the circumferential direction on the outer peripheral portion of the rotor core 16 so as to be partially arranged in the slits 102. Each of the permanent magnets 54 is arranged so as to face the stator 12 (teeth 30) between any adjacent magnetic pole portions 56 in the circumferential direction. The permanent magnets 54 here may be embedded in the rotor core 16 or may be exposed to the surface (outer peripheral surface) of the rotor core 16. In addition, the permanent magnets 54 may be arranged inside the rotor core 16 in a V shape. In the configuration example shown in FIG. 15, the revolving magnetic fields that include space harmonic components, which are formed in the stator 12, link with the rotor coils 42n and 42s to cause direct currents rectified by the diodes 21n and 21s to flow through the rotor coils 42n and 42s to thereby magnetize the magnetic pole portions 56. As a result, the magnetic pole portions 56 function as magnets having fixed magnetic poles. At this time, the width of each of the magnetic pole portions 56 (the width θ of each of the rotor coils 42n and 42s) in the circumferential direction is set so as to be shorter than the width corresponding to 180° in electric angle of the rotor 14, and the rotor coils 42n and 42s are wound around the corresponding magnetic pole portions 56 by short pitch winding to thereby make it possible to efficiently increase induced electromotive forces due to space harmonics, which are generated in the rotor coils 42n and 42s. Furthermore, in order to maximize induced electromotive forces due to space harmonics, which are generated in the rotor coils 42n and 42s, the width θ of each of the rotor coils 42n and 42s in the circumferential direction is desirably equal (or substantially equal to) the width corresponding to 90° in electric angle of the rotor 14. The other configuration and operation are similar to those of the above described embodiments.

Figure 16:
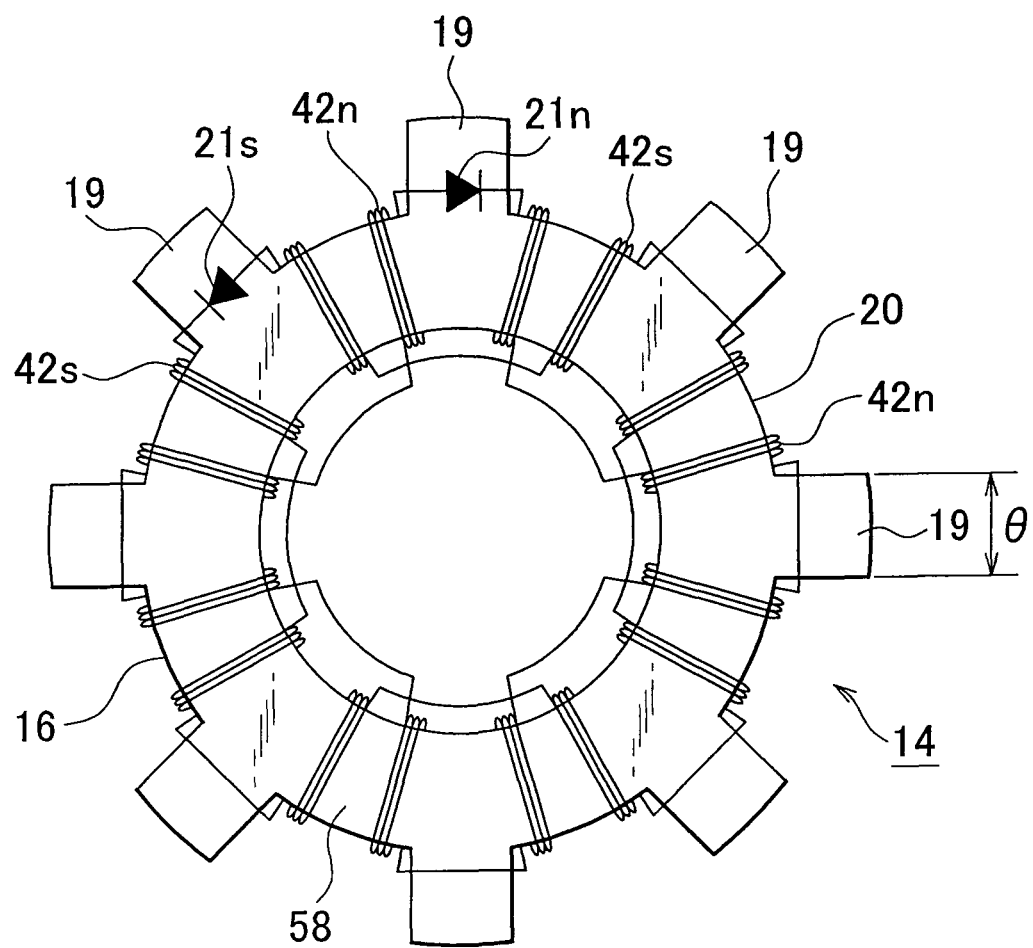
FIG. 16 is a schematic view that shows a rotor of another configuration example of the rotary electric machine that constitutes the embodiment of the invention.

In addition, in the above described embodiments, for example, as shown in FIG. 16, the rotor coils 42n and 42s may be wound by toroidal winding. In the configuration example shown in FIG. 16, the rotor core 16 includes an annular core portion 58, and each of the teeth 19 protrudes from the annular core portion 58 toward the outer side in the radial direction (toward the stator 12). The rotor coils 42n and 42s are wound at positions of the annular core portion 58 near the teeth 19 by toroidal winding. In addition, the rotor coils 42n and 42s are wound at multiple portions of the rotor core 16 in the circumferential direction so as to be partially arranged in the slots 20. In the configuration example shown in FIG. 16 as well, the revolving magnetic fields that include space harmonic components, which are formed in the stator 12, link with the rotor coils 42n and 42s to cause direct currents rectified by the diodes 21n and 21s to flow through the rotor coils 42n and 42s to thereby magnetize the teeth 19. As a result, the teeth 19 located near the rotor coils 42n function as north poles, and the teeth 19 located near the rotor coils 42s function as south poles. At this time, the width θ of each of the teeth 19 in the circumferential direction is set so as to be shorter than the width corresponding to 180° in electric angle of the rotor 14 to thereby make it possible to efficiently increase induced electromotive forces due to space harmonics, which are generated in the rotor coils 42n and 42s. Furthermore, in order to maximize induced electromotive forces due to space harmonics, which are generated in the rotor coils 42n and 42s, the width θ of each of the teeth 19 in the circumferential direction is desirably equal (or substantially equal to) the width corresponding to 90° in electric angle of the rotor 14. Note that FIG. 16 shows an example in which any adjacent rotor coils 42n and 42s in the circumferential direction are electrically isolated from each other, the rotor coils 42n arranged alternately in the circumferential direction are electrically connected in series with one another and the rotor coils 42s arranged alternately in the circumferential direction are electrically connected in series with one another as in the case of the configuration example shown in FIG. 2. However, in the example in which the rotor coils 42n and 42s are wound by toroidal winding as well, as in the case of the configuration example shown in FIG. 23 to FIG. 25, the rotor coils 42n and 42s wound around the corresponding teeth 19 each may be electrically isolated from one another. The other configuration and operation are similar to those of the above described embodiments.

Figure 17:
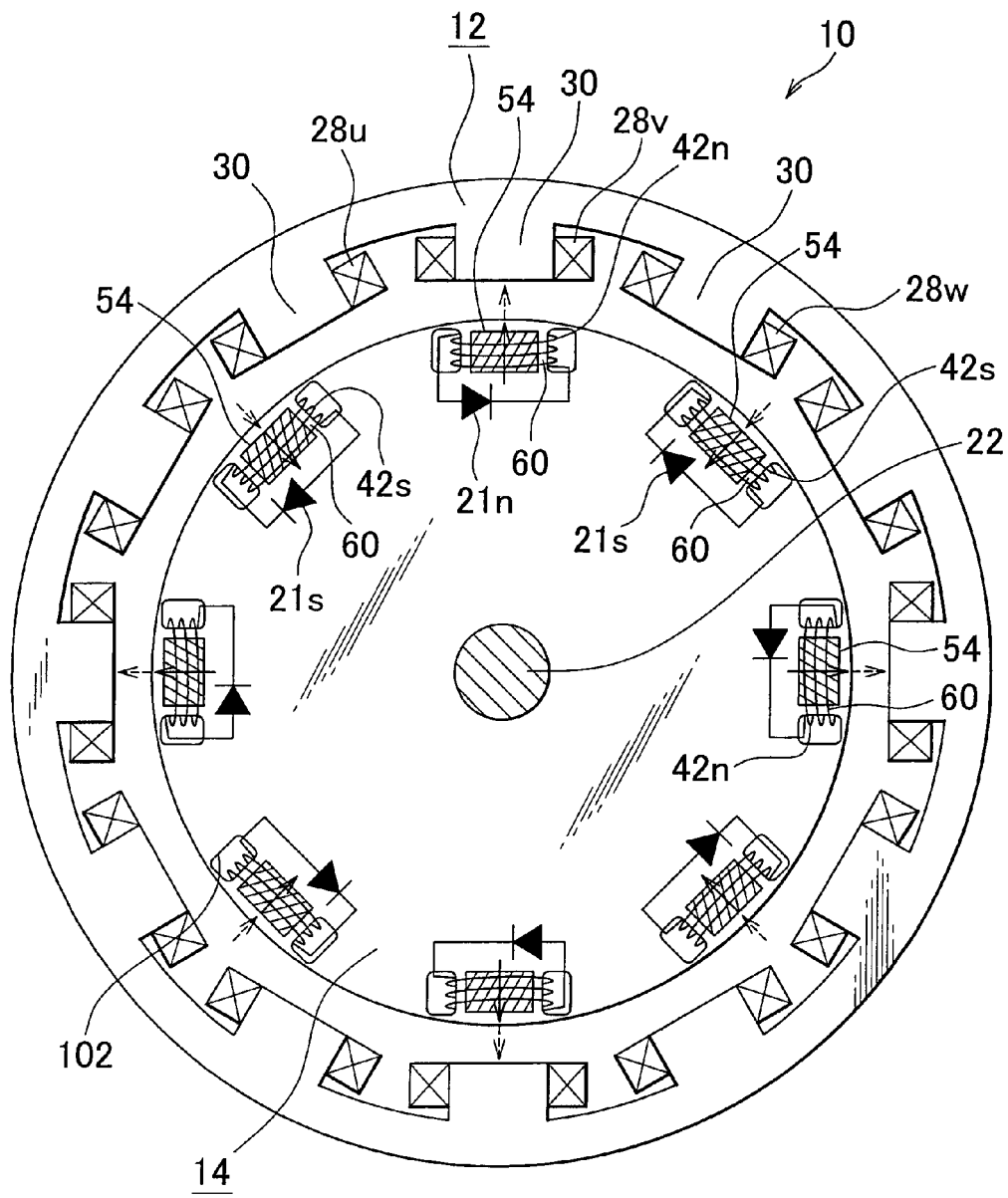
FIG. 17 is a schematic view of another configuration example of the rotary electric machine that constitutes the embodiment of the invention when viewed in the direction parallel to the rotation axis of the rotor.
Figure 18:
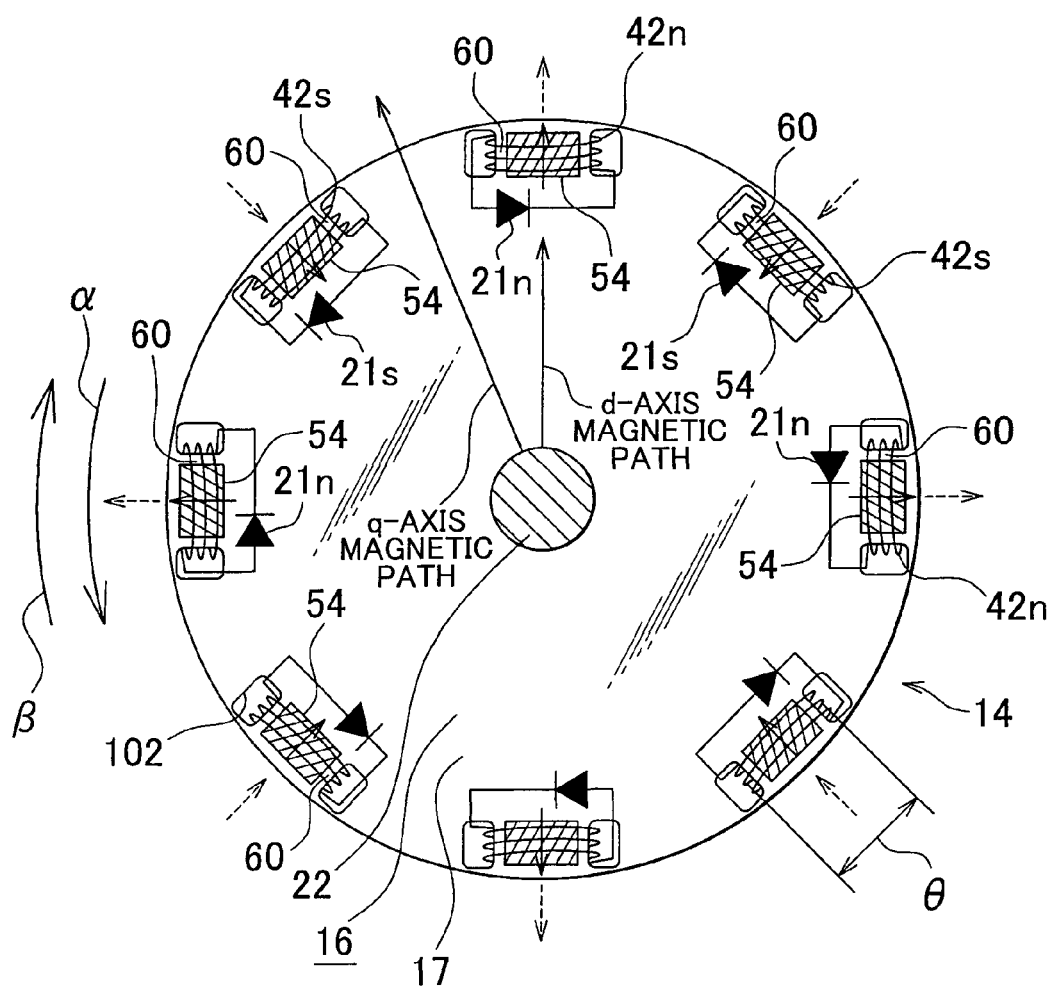
FIG. 18 is a schematic view that shows the rotor of the configuration example of FIG. 17.

In addition, as described in the following configuration example, in the above described embodiments, it is applicable that the rotor coils of the rotary electric machine are arranged at the same positions as those of the magnets of the rotor, at the same positions as those of the slots, each of which is formed between any adjacent teeth, or at the same positions as those of the portions having magnetic salient pole characteristics due to the plurality of slits. FIG. 17 is a schematic view of a rotary electric machine when viewed in the direction parallel to the rotation axis. FIG. 18 is a schematic view that shows the schematic configuration of the rotor of FIG. 17 when viewed in the direction parallel to the rotation axis.

The rotary electric machine 10 according to the present configuration example includes a stator 12 and a rotor 14. The stator 12 is fixed to a casing (not shown). The rotor 14 is arranged on the inner side of the stator 12 in the radial direction so as to face the stator 12 with a predetermined gap, and is rotatable with respect to the stator 12. Note that the configuration and operation of the stator 12 are similar to those of the embodiment shown in FIG. 1 to FIG. 8.

As shown in FIG. 18, the rotor 14 includes a rotor core 16 and rotor coils 42n and 42s. The rotor coils 42n and 42s are arranged and wound at multiple portions of the rotor core 16 in the circumferential direction. The rotor core 16 includes a rotor core body 17 made of a magnetic material and permanent magnets 54 arranged at multiple portions of the rotor 14 in the circumferential direction. The rotor 14 is fixed to the rotary shaft 22. Magnetic pole portions 60, such as pillar portions extending in the radial direction, are formed at multiple portions of the rotor core 16 in the circumferential direction, and the rotor coils 42*n* and 42*s* are wound around the corresponding magnetic pole portions 60. That is, slits 102 that are rotor slots are formed at multiple portions of the rotor core 16 in the circumferential direction, and the rotor coils 42*n* and 42*s* are wound at multiple portions of the outer peripheral portion of the rotor core 16 in the circumferential direction so as to be partially arranged in the slits 102.

The permanent magnets 54 are arranged, that is, embedded, inside the magnetic pole portions 60 at multiple portions of the rotor 14 in the circumferential direction, which correspond to the rotor coils 42*n* and 42*s* in the circumferential direction of the rotor 14. Conversely, the rotor coils 42*n* and 42*s* are wound around the corresponding permanent magnets 54. The permanent magnets 54 are magnetized in the radial direction of the rotor 14, and the magnetized directions are varied between any adjacent permanent magnets 54 in the circumferential direction of the rotor 14. In FIG. 17 and FIG. 18 (the same applies to FIG. 19 described later), the solid arrows on the permanent magnets 54 indicate the magnetized directions of the permanent magnets 54. Note that the magnetic pole portions 60 may be formed of salient poles, or the like, that are arranged so as to extend in the radial direction at multiple portions of the rotor 14 in the circumferential direction.

The rotor 14 has different magnetic salient pole characteristics in the circumferential direction. Where the magnetic path of the circumferential center between any adjacent magnetic pole portions 60 in the circumferential direction, which is located so as to deviate from the permanent magnets 54 in the circumferential direction and also deviate from the magnetic pole portions 60 in the rotor 14 is termed a q-axis magnetic path and the magnetic path that coincides in the circumferential direction with the winding central axis of each of the rotor coils 42*n* and 42*s* is termed a d-axis magnetic path, the permanent magnets 54 are respectively arranged in the d-axis magnetic paths located at multiple portions of the rotor 14 in the circumferential direction.

In addition, the rotor coils 42*n* and 42*s* wound around the corresponding magnetic pole portions 60 are not electrically connected to one another but are isolated (insulated) from one another. Then, any one of diodes 21*n* and 21*s* that are rectifier elements is connected in parallel with each of the electrically isolated rotor coils 42*n* and 42*s*. In addition, the direction in which current flows through each of the diodes 21*n* connected to the alternately arranged rotor coils 42*n* in the circumferential direction of the rotor 14 and the direction in which current flows through each of diodes 21*s* connected to the remaining rotor coils 42*s* are inverted to set the forward directions of the diodes 21*n* and 21*s* in opposite directions. Therefore, each of the rotor coils 42*n* and 42*s* is short-circuited via the diode 21*n* or 21*s*. Thus, currents that flow through the rotor coils 42*n* and 42*s* are rectified in one direction. In the case of the present configuration example as well, the diodes 21*n* and 21*s* rectify currents that flow through the rotor coils 42*n* and 42*s* because of generated induced electromotive forces to thereby vary the phases of currents flowing through any adjacent rotor coils 42*n* and 42*s* in the circumferential direction of the rotor 14 alternately between the A phase and the B phase.

When direct currents according to the rectification directions of the diodes 21*n* and 21*s* flow through the rotor coils 42*n* and 42*s*, the magnetic pole portions 60 around which the rotor coils 42*n* and 42*s* are wound are magnetized to cause the magnetic pole portions 60 to function as magnets having fixed magnetic poles. The directions of the broken arrows shown on the outer sides of the rotor coils 42*n* and 42*s* in the radial direction of the rotor 14 in FIG. 17 and FIG. 18 indicate the magnetized directions of the magnetic pole portions 60.

In addition, as shown in FIG. 18, the directions of direct currents are mutually opposite between any adjacent rotor coils 42*n* and 42*s* in the circumferential direction of the rotor 14. Then, the magnetized directions are mutually opposite between any adjacent magnetic pole portions 60 in the circumferential direction of the rotor 14. That is, in the present configuration example, the magnetic characteristics of the magnetic pole portions 60 are alternately varied in the circumferential direction of the rotor 14. For example, in FIG. 17 and FIG. 18, the north poles are arranged on the radially outer sides of portions that coincide in the circumferential direction of the rotor 14 with the rotor coils 42*n*, which are the alternately arranged magnetic pole portions 60 in the circumferential direction of the rotor 14, and south poles are arranged on the radially outer sides of portions that coincide in the circumferential direction of the rotor 14 with the rotor coils 42*s*, which are the magnetic pole portion 60 adjacent to the north-pole magnetic pole portions 60 in the circumferential direction. Then, any adjacent two of the magnetic pole portions 60 (north pole and south pole) in the circumferential direction of the rotor 14 constitute one pole pair. In addition, the magnetized directions of the permanent magnets 54 are brought into coincidence with the magnetized directions of the magnetic pole portions 60 that coincide in the circumferential direction of the rotor 14 with the permanent magnets 54.

In addition, in the example shown in FIG. 17 and FIG. 18, the eight magnetic pole portions 60 are formed, and the number of pole pairs of the rotor 14 is four. In addition, the number of pole pairs of the stator 12 (FIG. 17) and the number of pole pairs of the rotor 14 both are four, and the number of pole pairs of the stator 12 is equal to the number of pole pairs of the rotor 14. However, the number of pole pairs of the stator 12 and the number of pole pairs of the rotor 14 each may be other than four.

In addition, in the present configuration example, the width of each of the magnetic pole portions 60 in the circumferential direction of the rotor 14 is set so as to be shorter than the width corresponding to 180° in electric angle of the rotor 14. Then, the width θ (FIG. 18) of each of the rotor coils 42*n* and 42*s* in the circumferential direction is set so as to be shorter than the width corresponding to 180° in electric angle of the rotor 14, and the rotor coils 42*n* and 42*s* are wound around the corresponding magnetic pole portions 60 by short pitch winding. In addition, desirably, the width θ of each of the rotor coils 42*n* and 42*s* in the circumferential direction of the rotor 14 is equal to (or substantially equal to) the width corresponding to 90° in electric angle.

In the thus configured rotary electric machine 10, three-phase alternating currents are passed through the three-phase stator coils 28*u*, 28*v* and 28*w* to cause the revolving magnetic fields having frequencies that include harmonic components, which are generated by the teeth 30 (FIG. 17), to be applied to the rotor 14. Then, in response to this, reluctance torque Tre, permanent magnet torque Tmg generated by the permanent magnets and rotor coil torque Tcoil generated by the rotor coils act on the rotor 14 to cause the rotor 14 to be driven for rotation in synchronization with the revolving magnetic fields (fundamental components) generated by the stator 12. Here, the reluctance torque Tre is torque generated as a result of the respective magnetic pole portions 60 being attracted by the revolving magnetic fields generated by the stator 12. In addition, the permanent magnet torque Tmg is torque generated because of attraction and repulsion actions, which are interactions between the magnetic fields generated by the permanent magnets 54 and the revolving magnetic fields generated by the stator 12. In addition, the rotor coil torque Tcoil is torque caused by currents induced by the rotor coils 42n and 42s as a result of the space harmonic components of magnetomotive force generated by the stator 12 being applied to the rotor coils 42n and 42s. This torque is generated by attraction and repulsion actions, which are electromagnetic interactions between the magnetic fields generated by the magnetic pole portions 60 and the revolving magnetic fields generated by the stator 12.

With the above rotary electric machine 10 according to the present configuration example, it is possible to effectively increase the torque of the rotary electric machine 10. In addition, fluctuations in magnetic fluxes in the permanent magnets 54 are suppressed by induced currents flowing through the rotor coils 42n and 42s, so losses of eddy currents inside the respective permanent magnets 54 are suppressed to make it possible to reduce heat generation of magnets.

Figure 19:
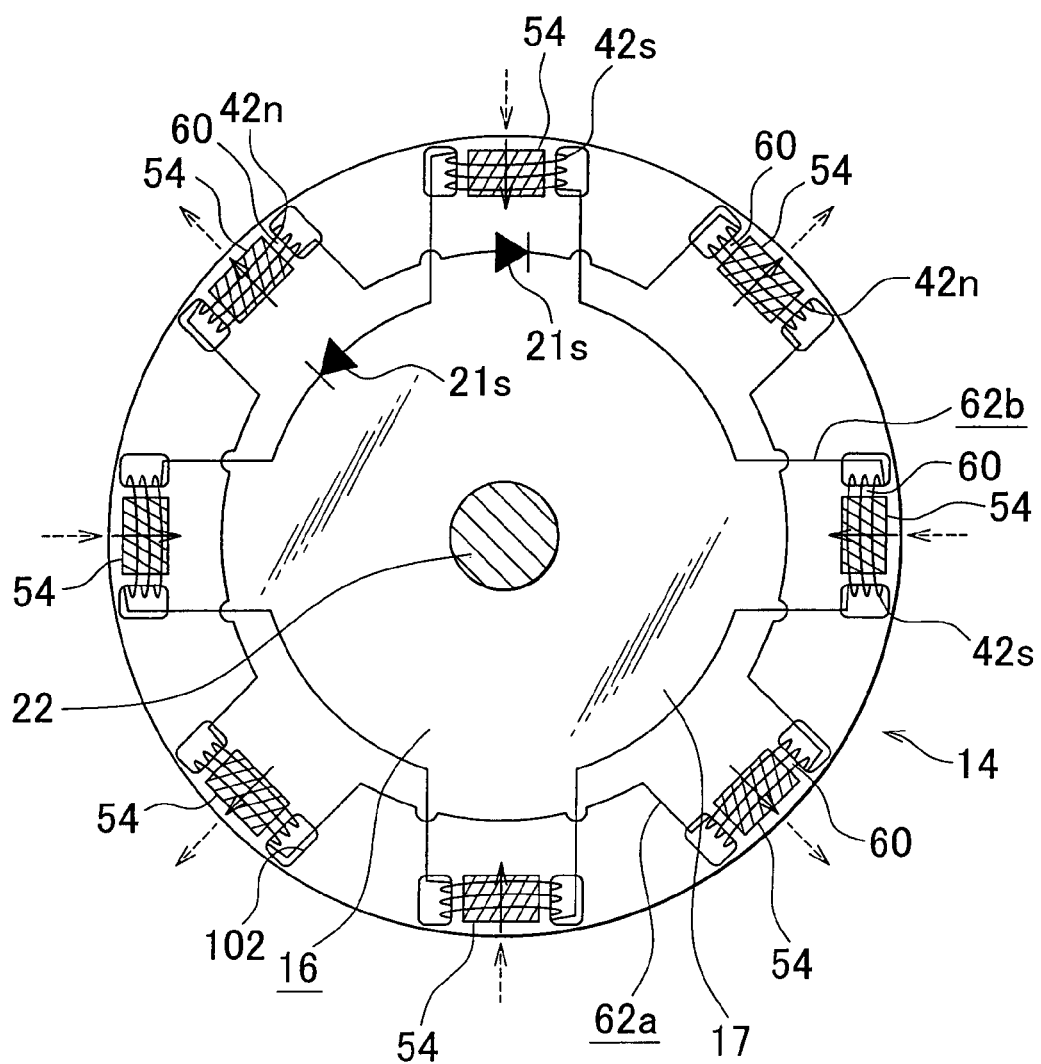
FIG. 19 is a schematic view that shows a rotor of another configuration example of the rotary electric machine that constitutes the embodiment of the invention.

In addition, FIG. 19 is a schematic view that corresponds to FIG. 18 in another configuration example. In the present configuration example, the rotor coils 42n, which are part of the plurality of rotor coils 42n and 42s, arranged alternately in the circumferential direction of the rotor 14, are electrically connected in series with one another, and the remaining rotor coils 42s arranged alternately in the circumferential direction are electrically connected in series with one another. That is, the rotor coils 42n or 42s that are wound around the magnetic pole portions 60 that function as magnets and that are magnetized in the same directions are electrically connected in series with one another. In addition, the rotor coils 42n and 42s wound around any adjacent magnetic pole portions 60 in the circumferential direction of the rotor 14 are electrically isolated from each other. Then, a circuit that includes the rotor coils 42n that are electrically connected to one another and a circuit that includes the rotor coils 42s that are electrically connected to one another constitute a pair of rotor coil circuits 62a and 62b that are electrically isolated from each other. That is, the rotor coils 42n or 42s wound around the magnetic pole portions 60 having mutually the same magnetic characteristics are electrically connected to one another.

In addition, diodes 21n and 21s that are rectifier elements and that have mutually different polarities are respectively connected to the pair of rotor coil circuits 62a and 62b in series with the alternately arranged rotor coils 42n and 42s, and the directions of currents flowing through the rotor coil circuits 62a and 62b are rectified in one direction. In addition, current flowing through one of the pair of rotor coil circuits 62a and 62b and current flowing through the other one of the rotor coil circuits 62a and 62b are opposite to each other. The other configuration and operation are similar to those of the configuration example shown in FIG. 17 and FIG. 18.

Figure 20:
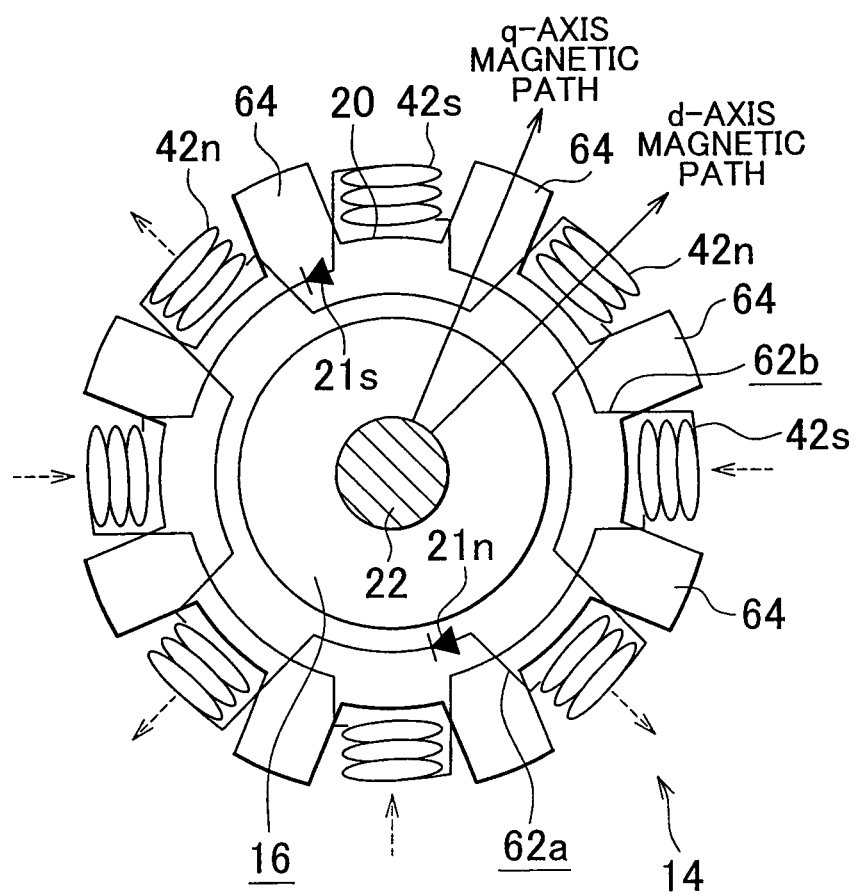
FIG. 20 is a schematic view that shows a rotor of another configuration example of the rotary electric machine that constitutes the embodiment of the invention.

FIG. 20 is a schematic view that corresponds to FIG. 18 in another configuration example. The rotor 14 that constitutes the rotary electric machine according to the present configuration example differs from the rotor 14 in the configuration example shown in FIG. 19 in that the permanent magnets 54 (see FIG. 19) provided for the rotor 14 are omitted. In addition, the rotor core 16 includes teeth 64 that protrudes in the radial direction at multiple portions of the outer peripheral surface in the circumferential direction, and arranges any one of the rotor coils 42n and 42s between any adjacent teeth 64 in the circumferential direction of the rotor 14. That is, the rotor coils 42n and 42s are arranged in a hollow state where the inside is hollow. In addition, a portion between any adjacent rotor coils 42n and 42s in the circumferential direction of the rotor 14 protrudes toward the stator 12 (see FIG. 17), and the rotor core 16 has magnetic salient pole characteristics. In this case, the rotor coils 42n and 42s are wound at multiple portions of the outer peripheral portion of the rotor core 16 in the circumferential direction so as to be partially or wholly arranged in the corresponding slots 20.

In the thus configured rotor 14, magnetic paths that coincide with the teeth 64 in the circumferential direction of the rotor 14 become q-axis magnetic paths, and positions that coincide with the rotor coils 42n and 42s in the circumferential direction of the rotor 14 become d-axis magnetic paths.

With the above present configuration example, different from the configuration example shown in FIG. 17 and FIG. 18, no permanent magnets 54 (see FIG. 18) are arranged in the rotor 14; however, the torque of the rotary electric machine may be increased irrespective of the rotation direction of the rotor 14. That is, the current phase-torque characteristic is the same irrespective of the rotation direction of the rotor 14, and the maximum value of the torque increases, so the torque may be effectively increased. For example, when power running torque is increased, it is possible to increase power running torque both during forward rotation and reverse rotation of the rotor 14. In addition, when regenerative torque is increased, it is possible to increase regenerative torque both during forward rotation and reverse rotation of the rotor 14. Thus, it is possible to achieve the rotary electric machine that is able to obtain high torque both in forward rotation and reverse rotation of the rotor 14. The other configuration and operation are similar to those of the configuration example shown in FIG. 17 and FIG. 18 or the configuration example shown in FIG. 19.

Figure 21:
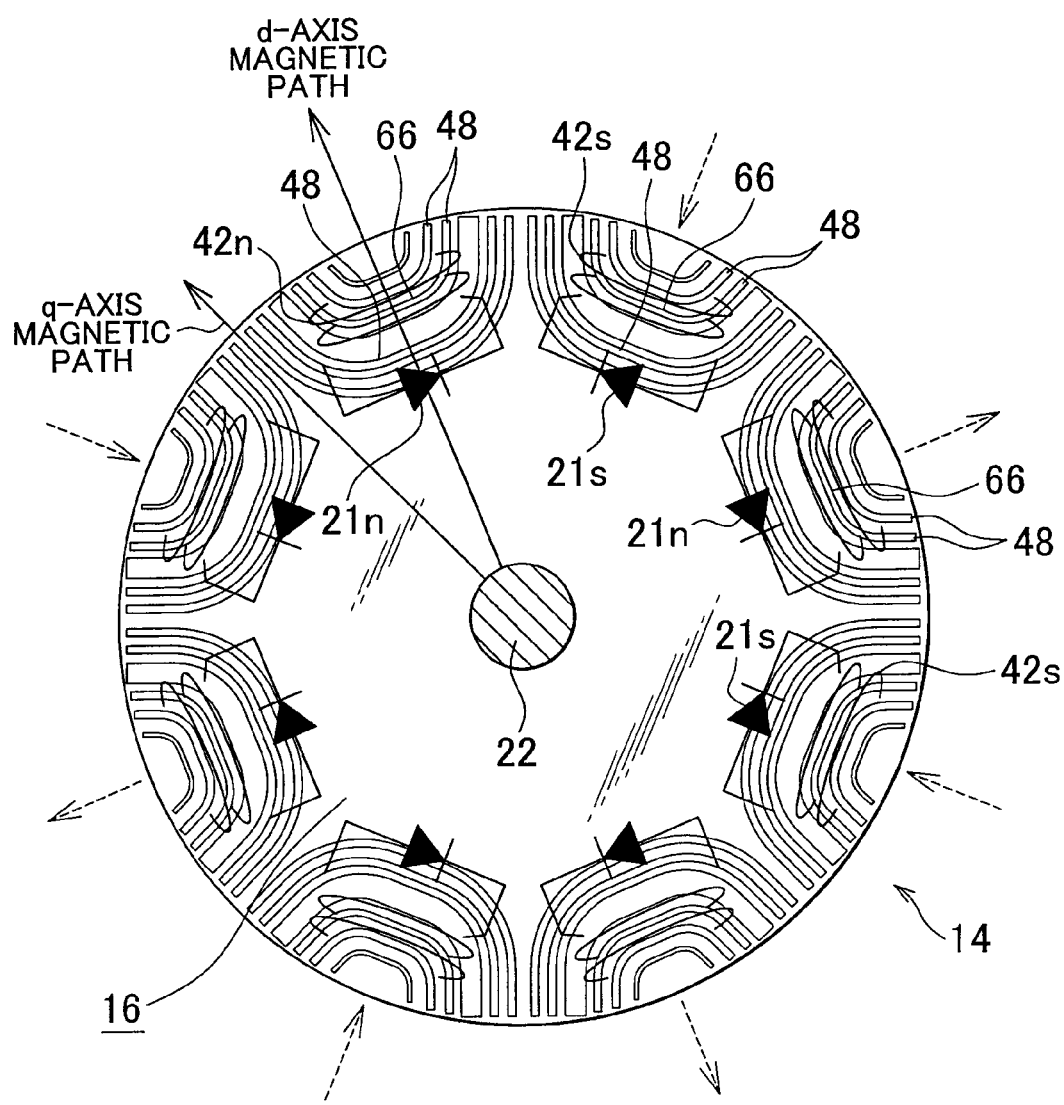
FIG. 21 is a schematic view that shows a rotor of another configuration example of the rotary electric machine that constitutes the embodiment of the invention.

FIG. 21 is a schematic view that corresponds to FIG. 18 in another configuration example. The rotor 14 that constitutes a rotary electric machine according to the present configuration example is also configured such that no permanent magnets 54 (see FIG. 18, and the like) are provided for the rotor 14 as in the case of the configuration example shown in FIG. 20. In the present configuration example, slits 48 that are airspace portions and rotor slots are formed inside the rotor core 16 that constitutes the rotor 14 to thereby vary the magnetic resistance of the rotor 14 in the rotation direction. That is, the plurality of slits 48 that extend in the axial direction in a substantially U shape in cross section and that have an open shape toward the outer side in the radial direction are arranged at multiple portions of the rotor core 16 in the circumferential direction so as to be spaced apart in the radial direction of the rotor 14. Then, rotor coils 42n and 42s are arranged at multiple portions of the rotor core 16 in the circumferential direction so as to coincide with the circumferential centers of the plurality of slits 48 to form d-axis magnetic paths, and the magnetic path between any adjacent slits 48 in the circumferential direction is a q-axis magnetic path.

In addition, the rotor coils 42n and 42s are respectively short-circuited by diodes 21n and 21s. The diodes 21n and 21s have different polarities between any adjacent rotor coils 42n and 42s. The rotor coils 42n respectively short-circuited by the diodes 21n and the rotor coils 42s respectively short-circuited by the diodes 21s are alternately arranged in the circumferential direction of the rotor 14, and the magnetic characteristics of the plurality of magnetic pole portions 66, generated by currents flowing through the rotor coils 42n and 42s, are alternately varied in the circumferential direction of the rotor 14. In this case, the slits 48 are formed at intervals in the circumferential direction around the rotation axis of the rotor 14 in the rotor core 16, and the rotor coils 42*n* and 42*s* are wound at multiple portions in the circumferential direction on the outer peripheral portion of the rotor core 16 so as to be partially arranged in the slits 48.

In the case of the above present configuration example, revolving magnetic fields from the stator 12 (see FIG. 17) link with the rotor coils 42*n* and 42*s* to cause direct currents rectified by the diodes 21*n* and 21*s* to flow through the rotor coils 42*n* and 42*s* to thereby magnetize the magnetic pole portions 66 located at multiple portions in the circumferential direction, that is, the d-axis magnetic paths, and the magnetic pole portions 66 function as magnets having fixed magnetic poles. In addition, the width of each of the rotor coils 42*n* and 42*s* in the circumferential direction of the rotor 14 is set so as to be shorter than the width corresponding to 180° in electric angle of the rotor 14, and the rotor coils 42*n* and 42*s* are wound around the respective magnetic pole portions 60 by short pitch winding. In addition, desirably, the width of each of the rotor coils 42*n* and 42*s* in the circumferential direction is equal to (or substantially equal to) the width corresponding to 90° in electric angle of the rotor 14.

In the case of the above present configuration example as well, no permanent magnets are arranged on the rotor 14; however, the torque of the rotary electric machine may be increased irrespective of the rotation direction of the rotor 14. The other configuration and operation are similar to those of the configuration example shown in FIG. 17 and FIG. 18.

Figure 22:
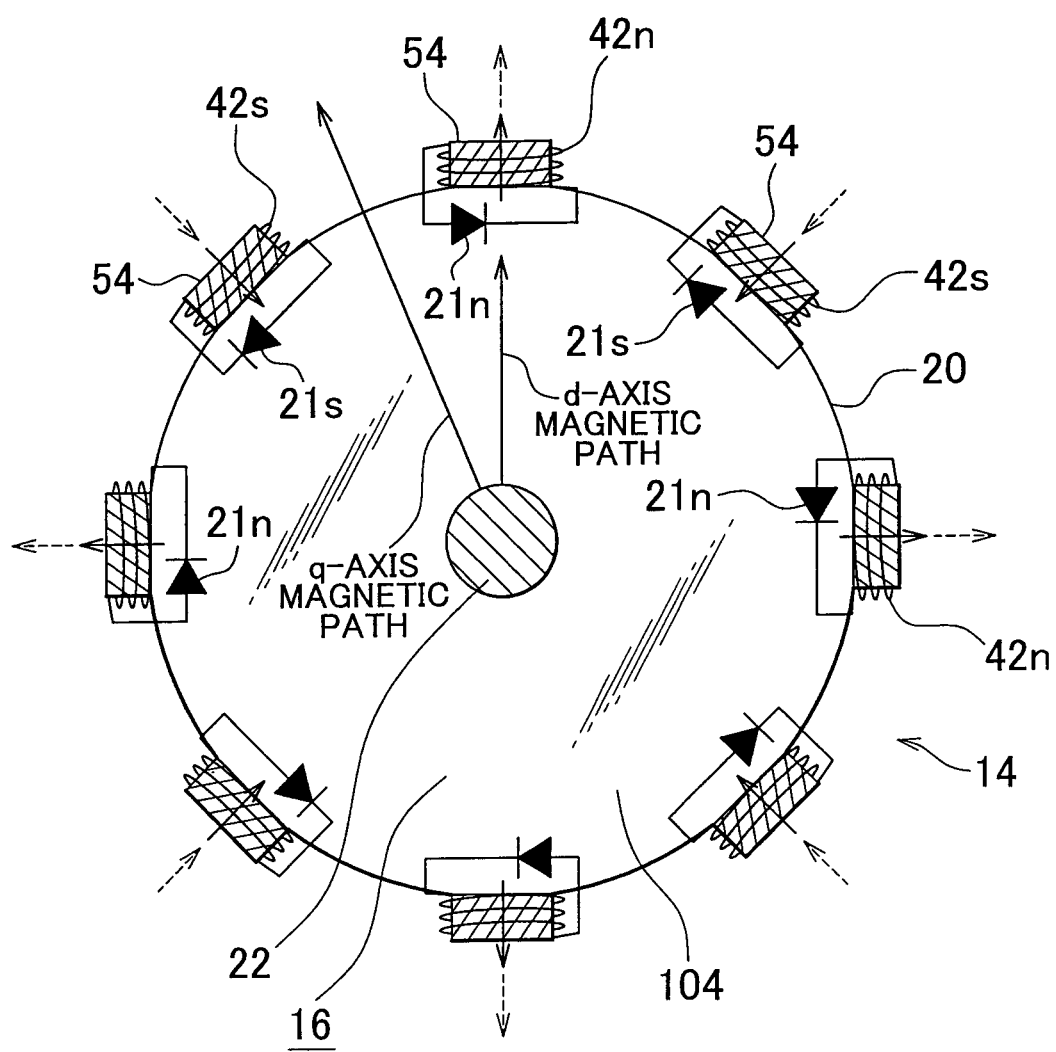
FIG. 22 is a schematic view that shows a rotor of another configuration example of the rotary electric machine that constitutes the embodiment of the invention.

FIG. 22 is a schematic view that corresponds to FIG. 18 in another configuration example. The rotor 14 that constitutes a rotary electric machine according to the present configuration example differs from the rotor 14 that constitutes the configuration example shown in FIG. 17 and FIG. 18 in that the rotor core 16 is formed of a rotor core body 104 made of a magnetic material and a plurality of permanent magnets 54. In addition, the rotor core body 104 does not have a magnetic salient pole characteristic, and the permanent magnets 54 are fixed at multiple portions of the outer peripheral surface of the rotor core body 104 in the circumferential direction. In addition, the rotor core 16 is formed such that a slot 20 is formed between any adjacent permanent magnets 54 at intervals in the circumferential direction around the rotation axis of the rotor. In addition, rotor coils 42*n* and 42*s* are wound around the corresponding permanent magnets 54. In this case, the rotor coils 42*n* and 42*s* are wound at multiple portions of the outer peripheral portion of the rotor core 16 in the circumferential direction so as to be partially arranged in the slots 20. In the present configuration example, portions that coincide in the circumferential direction with the permanent magnets 54 at multiple portions of the rotor 14 in the circumferential direction are formed as magnetic pole portions. In addition, the rotor coils 42*n* and 42*s* are respectively short-circuited by diodes 21*n* and 21*s*. The diodes 21*n* and 21*s* have different polarities between any adjacent rotor coils 42*n* and 42*s*. The other configuration and operation are similar to those of the configuration example shown in FIG. 17 and FIG. 18.

In the above embodiments and configuration examples, the radial rotary electric machine in which the stator 12 and the rotor 14 are arranged so as to face each other in the radial direction perpendicular to the rotary shaft 22 is described. However, the rotary electric machine that constitutes the above described embodiments may be an axial rotary electric machine in which the stator 12 and the rotor 14 are arranged so as to face each other in the direction parallel to the rotary shaft 22 (direction along the rotation axis). In addition, the case where the rotor is arranged on the inner side of the stator in the radial direction so as to face the stator is described above; instead, the aspect of the invention may also be implemented by the configuration that the rotor is arranged on the outer side of the stator in the radial direction so as to face the stator.

As described above, a rotary electric machine driving system according to the above embodiment includes: a rotary electric machine having a stator and a rotor that are arranged so as to face each other; a driving unit that drives the rotary electric machine; and a control unit that controls the driving unit. The stator has a stator core having stator slots formed at multiple portions in a circumferential direction and multi-phase stator coils wound around the stator core via the stator slots by concentrated winding. The rotor has a rotor core, rotor coils wound at multiple portions of the rotor core in the circumferential direction and a rectifier unit that is connected to the rotor coils and that varies magnetic characteristics of the respective rotor coils alternately in the circumferential direction among the plurality of rotor coils. The rotor varies magnetic characteristics of magnetic pole portions at multiple portions in the circumferential direction alternately in the circumferential direction. The magnetic characteristics are generated by currents flowing through the respective rotor coils. The control unit has a decreasing/increasing pulse superimposing unit that superimposes decreasing pulse current for a pulse-shaped decrease on a q-axis current command for passing currents through the stator coils so as to generate field magnetic fluxes in directions advanced by 90 degrees in electric angle with respect to magnetic pole directions that are winding central axis directions of the respective rotor coils, and superimposes increasing pulse current for a pulse-shaped increase on a d-axis current command for passing currents through the stator coils so as to generate field magnetic fluxes in the magnetic pole directions. Then, with this configuration, as described above, it is possible to achieve the rotary electric machine that is able to increase torque even in a low rotation speed range while preventing excessive currents from flowing through the stator coils.

The embodiments of the invention are described above; however, the aspect of the invention is not limited to the above embodiments. The aspect of the invention may be, of course, implemented in various forms without departing from the scope of the invention.

What is claimed is:

1. A rotary electric machine driving system comprising:
a rotary electric machine having a stator and a rotor that are arranged so as to face each other;
a driving unit that drives the rotary electric machine; and
a control unit that controls the driving unit, wherein
the stator has a stator core having a plurality of stator slots at intervals in a circumferential direction around a rotation axis of the rotor and multi-phase stator coils that are wound around the stator core via the stator slots by concentrated winding,
the rotor has a rotor core having a plurality of rotor slots at intervals in the circumferential direction around the rotation axis of the rotor, rotor coils that are wound at multiple portions of the rotor core in the circumferential direction so as to be at least partially arranged in the rotor slots and a rectifier unit that is connected to the rotor coils and that varies magnetic characteristics of the respective rotor coils alternately in the circumferential direction among the plurality of rotor coils,
the rotor varies magnetic characteristics of magnetic pole portions at multiple portions in the circumferential direction alternately in the circumferential direction, the magnetic characteristics being generated by currents flowing through the respective rotor coils, and the control unit has a decreasing/increasing pulse superimposing unit that superimposes decreasing pulse current for a pulse-shaped decrease on a q-axis current command for passing currents through the stator coils so as to generate field magnetic fluxes in directions advanced by 90 degrees in electric angle with respect to magnetic pole directions that are winding central axis directions of the respective rotor coils, and superimposes increasing pulse current for a pulse-shaped increase on a d-axis current command for passing currents through the stator coils so as to generate field magnetic fluxes in the magnetic pole directions.

2. The rotary electric machine driving system according to claim 1, wherein the decreasing/increasing pulse superimposing unit superimposes the increasing pulse current on the d-axis current command and does not superimpose the decreasing pulse current on the q-axis current command when an output torque of the rotary electric machine is lower than or equal to a threshold, and superimposes the increasing pulse current on the d-axis current command and superimposes the decreasing pulse current on the q-axis current command when the output torque exceeds the threshold.

3. The rotary electric machine driving system according to claim 1, wherein the decreasing/increasing pulse superimposing unit superimposes the decreasing pulse current on the q-axis current command and superimposes the increasing pulse current on the d-axis current command such that a current vector after pulse current is superimposed on stator currents to be passed through the stator coils falls within a control circle drawn by a distal end of a current vector that is defined in dq coordinate system when the pulse current is not superimposed on the stator currents.

4. The rotary electric machine driving system according to claim 1, wherein each of the rotor coils is connected to any one of rectifier elements that serve as the rectifier unit and of which forward directions are opposite between any adjacent two of the rotor coils in the circumferential direction of the rotor, and the rectifier elements rectify currents that are generated by induced electromotive forces to flow through the rotor coils to thereby vary phases of currents flowing through any adjacent two of the rotor coils in the circumferential direction alternately between an A phase and a B phase.

5. The rotary electric machine driving system according to claim 4, wherein the rectifier elements are a first rectifier element and a second rectifier element that are respectively connected to the corresponding rotor coils, and the first rectifier element and the second rectifier element independently rectify currents generated due to the generated induced electromotive forces so that the rectified currents flow through the corresponding rotor coils, and vary the magnetic characteristics of the magnetic pole portions at multiple portions in the circumferential direction alternately in the circumferential direction, the magnetic characteristics being generated by currents flowing through the respective rotor coils.

6. The rotary electric machine driving system according to claim 5, wherein the rotor core includes salient poles that are the plurality of magnetic pole portions that are arranged at intervals in the circumferential direction of the rotor and that protrude toward the stator, the salient poles are magnetized as currents rectified by the rectifier elements flow through the rotor coils to thereby function as magnets having fixed magnetic poles, the rotor further has auxiliary rotor coils that are wound at proximal portions of the respective salient poles, any two of the auxiliary rotor coils wound around any adjacent two of the salient poles in the circumferential direction of the rotor are connected in series with each other to constitute an auxiliary coil set, one ends of any adjacent two of the rotor coils, wound around any adjacent two of the salient poles in the circumferential direction of the rotor, are connected to each other at a connection point via the respectively corresponding rectifier elements such that the respectively corresponding rectifier elements face each other in opposite directions, the other ends of the any adjacent two of the rotor coils, wound around any adjacent two of the salient poles in the circumferential direction of the rotor, each are connected to one end of the auxiliary coil set, and the connection point is connected to the other end of the auxiliary coil set.

7. The rotary electric machine driving system according to claim 1, wherein the rotor core includes salient poles that are the plurality of magnetic pole portions that are arranged at intervals in the circumferential direction of the rotor and that protrude toward the stator, and the salient poles are magnetized as currents rectified by the rectifier unit flow through the rotor coils to thereby function as magnets having fixed magnetic poles.

8. The rotary electric machine driving system according to claim 7, wherein a width of each salient pole in the circumferential direction of the rotor is smaller than a width corresponding to 180° in electric angle, and each of the rotor coils is wound around a corresponding one of the salient poles by short pitch winding.

9. The rotary electric machine driving system according to claim 8, wherein a width of each rotor coil in the circumferential direction of the rotor is equal to a width corresponding to 90° in electric angle.

* * * * *